(12) United States Patent
Nozaki et al.

(10) Patent No.: US 9,147,106 B2
(45) Date of Patent: Sep. 29, 2015

(54) DIGITAL CAMERA SYSTEM

(71) Applicant: NIKON CORPORATION, Tokyo (JP)

(72) Inventors: Hirotake Nozaki, Tokyo (JP); Hideo Hibino, Yamato (JP); Toshiaki Kobayashi, Nishigo-mura (JP); Norizaku Yokonuma, Tokyo (JP); Satoshi Ejima, Tokyo (JP); Tadashi Ohta, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 13/964,648

(22) Filed: Aug. 12, 2013

(65) Prior Publication Data

US 2013/0329029 A1 Dec. 12, 2013

Related U.S. Application Data

(63) Continuation of application No. 13/067,502, filed on Jun. 6, 2011, now abandoned, which is a continuation of application No. 12/289,689, filed on Oct. 31, 2008, now abandoned, which is a continuation of application No. 10/814,142, filed on Apr. 1, 2004, now abandoned.

(30) Foreign Application Priority Data

| Apr. 15, 2003 | (JP) | 2003-109882 |
| Apr. 15, 2003 | (JP) | 2003-109883 |
| Apr. 15, 2003 | (JP) | 2003-109884 |
| Apr. 15, 2003 | (JP) | 2003-109885 |
| Apr. 15, 2003 | (JP) | 2003-109886 |

(51) Int. Cl.
*H04N 5/222* (2006.01)
*G06K 9/00* (2006.01)

(Continued)

(52) U.S. Cl.
CPC .......... *G06K 9/00268* (2013.01); *H04N 5/2351* (2013.01); *H04N 5/23212* (2013.01); *H04N 5/23229* (2013.01); *H04N 5/23293* (2013.01)

(58) Field of Classification Search
USPC ........................ 348/207.99, 169, 77, 208.14, 348/333.01–333.12; 382/118, 116, 282, 382/289, 237, 270, 170
See application file for complete search history.

(56) References Cited

U.S. PATENT DOCUMENTS

| 5,075,715 A | 12/1991 | Sakai |
| 5,347,371 A | 9/1994 | Nishimura et al. |

(Continued)

FOREIGN PATENT DOCUMENTS

| EP | 1 128 316 A1 | 8/2001 |
| JP | A-02-251941 | 10/1990 |

(Continued)

OTHER PUBLICATIONS

Toshiyuki Kozuru et al., "Development of Real-time Face Detection and Recognition System for Surveillance Camera," Omron Technics, 2003, pp. 1-13, vol. 43, No. 1 (145th Issue), (with translation).

(Continued)

*Primary Examiner* — Yogesh Aggarwal
(74) *Attorney, Agent, or Firm* — Oliff PLC

(57) ABSTRACT

A digital camera system capable of operating by detecting a feature point, which has not been accomplished, in addition to ordinary functions of a conventional camera is provided. According to an aspect of the present invention, a digital camera system includes a detecting means that detects a given feature point from an image data, a receiving means that receives an order from a user, a selecting means that selects each feature point in accordance with a given order instructed by the receiving means when a plurality of feature points are detected, and a display that displays feature point information identifying the feature point selected by the selecting means.

20 Claims, 18 Drawing Sheets

(51) Int. Cl.
  *H04N 5/232* (2006.01)
  *H04N 5/235* (2006.01)

(56) References Cited

U.S. PATENT DOCUMENTS

| | | | |
|---|---|---|---|
| 5,812,193 | A | 9/1998 | Tomitaka et al. |
| 5,982,912 | A | 11/1999 | Fukui et al. |
| 6,035,074 | A | 3/2000 | Fujimoto et al. |
| 6,118,484 | A | 9/2000 | Yokota et al. |
| 6,859,552 | B2 | 2/2005 | Izume et al. |
| 6,940,545 | B1 * | 9/2005 | Ray et al. .................. 348/222.1 |
| 7,298,412 | B2 | 11/2007 | Sannoh et al. |
| 2001/0036298 | A1 | 11/2001 | Yamada et al. |
| 2002/0101619 | A1 | 8/2002 | Tsubaki et al. |
| 2003/0223622 | A1 * | 12/2003 | Simon et al. .................. 382/118 |

FOREIGN PATENT DOCUMENTS

| | | |
|---|---|---|
| JP | A-9-233384 | 9/1997 |
| JP | A-10-232934 | 9/1998 |
| JP | A-11-220683 | 8/1999 |
| JP | A-2000-089311 | 3/2000 |
| JP | A-2000-305141 | 11/2000 |
| JP | A-2001-008088 | 1/2001 |
| JP | A-2001-167110 | 6/2001 |
| JP | A-2001-218020 | 8/2001 |
| JP | A-2001-330882 | 11/2001 |
| JP | A-2002-051255 | 2/2002 |
| JP | A-2002-150287 | 5/2002 |
| JP | A-2002-191044 | 7/2002 |
| JP | A-2002-247436 | 8/2002 |
| JP | A-2002-305717 | 10/2002 |
| JP | A-2002-333652 | 11/2002 |
| JP | A-2003-075717 | 3/2003 |
| JP | A-2003-107335 | 4/2003 |
| JP | A-2003-107567 | 4/2003 |
| WO | WO 02/09024 A1 | 1/2002 |

OTHER PUBLICATIONS

Satoh et al.; "Name-It: Naming and Detecting Faces in News Videos;" IEEE Multimedia; IEEE Computer Society; vol. 6; No. 1; Jan. 1999; pp. 22-35; XP-000832068.

Search Report issued in European Patent Application No. 04252199.7; Jan. 12, 2005.

May 24, 2012 Office Action issued in U.S. Appl. No. 13/067,502.

Feb. 11, 2013 Office Action issued in U.S. Appl. No. 13/067,502.

* cited by examiner

FEATURE POINT INFO AREA

- NAME: MR. A
  - PRIORITY: 1
  - STORED DATE
    - (1) FEB. 10, 2000
    - (2) OCT. 5, 2000
    - (3) JUL. 12, 2001

- NAME: MS. B
  - PRIORITY: 3
  - STORED DATE
    - (1) JAN. 10, 2002

- NAME: MS. C
  - PRIORITY: 2
  - STORED DATE
    - (1) FEB. 10, 2000

- NAME: MR. UNKNOWN 1
  - PRIORITY: N/A
  - STORED DATE
    - (1) JAN. 26, 2002

．
．
．

FEATURE POINT DATA AREA

| A(1) |
| A(2) |
| A(3) |
| B(1) |
| C(1) |
| N/A1(1) |
| ． |
| ． |
| ． |

FIG. 13

```
FILE NAME   DSC002

FEATURE POINT INFO AREA

· NAME: MR. A
  · PRIORITY: 1
  · DETECTED DATE: FEB. 10, 2000
  · DETECTED POSITION: (x, y) = (123, 456)
  · ADDED DATE:     (2) OCT. 5, 2000
                    (3) JUL. 12, 2001

· NAME: MS. C
  · PRIORITY: 2
  · DETECTED DATE: FEB. 10, 2000
  · DETECTED POSITION: (x, y) = (987, 654)

FEATURE POINT DATA AREA
                A(1)
                A(2)
                A(3)
                C(1)

IMAGE DATA AREA
```

FIG. 14

DIGITAL CAMERA SYSTEM

INCORPORATION BY REFERENCE

This is a Continuation of application Ser. No. 13/067,502 filed Jun. 6, 2011, which is a Continuation of application Ser. No. 12/289,689 filed Oct. 31, 2008, which is a Continuation of application Ser. No. 10/814,142 filed Apr. 1, 2004. The disclosures of the prior applications are hereby incorporated by reference herein in their entirety.

The disclosures of the following priority applications are herein incorporated by reference:

Japanese Patent Application No. 2003-109882 filed on Apr. 15, 2003;

Japanese Patent Application No. 2003-109883 filed on Apr. 15, 2003;

Japanese Patent Application No. 2003-109884 filed on Apr. 15, 2003;

Japanese Patent Application No. 2003-109885 filed on Apr. 15, 2003; and

Japanese Patent Application No. 2003-109886 filed on Apr. 15, 2003.

BACKGROUND OF THE INVENTION

1. Field of the Invention

The present disclosure relates to a digital camera system capable of detecting a feature point of a person and operating on the basis of the detected result.

2. Description of Related Art

The method for detecting a person from an image data has been known starting from a system that confirms a person himself by comparing fingerprints or the iris with that stored in advance. U.S. Pat. No. 5,982,912 precisely discloses a method that discriminates a person by comparing feature points detected from an input image with feature points such as an eye, a nose, a mouth, and the like stored in advance. Japanese Laid-Open Patent Application No. 10-232934 discloses a method that increases accuracy of the image dictionary upon storing feature points detected in such manner. The following examples are applications of such method to a camera.

U.S. Pat. No. 5,347,371 discloses a video camera that separately controls parameters for processing a specific subject portion and those for the other portion by detecting the specific subject signal. Accordingly, for example, white balance of the subject can be corrected and the background can be defocused upon shooting portrait photography.

U.S. Pat. No. 5,812,193 discloses a video camera that calculates the area of the detected face image and carries out zooming process comparing it with a reference face area.

Japanese Laid-Open Patent Application No. 9-233384 discloses an image input device that divides a shot image data into a given number and automatically expands and outputs a divided image including a specific image among the divided images.

EP1128316A1(28 Feb. 2000 U.S. Pat. No. 514,436) discloses a camera that stores data such as coordinates and dimension of a face detected by a face-detection-algorism, position of the eye and a pose of the head together with the image data. Moreover, it discloses that the camera carries out automatic red-eye correction algorism and applies to a detected face a face-priority-color-balance algorism.

Japanese Laid-Open Patent Application No. 2001-218020 discloses an image processing method that assumes sex of a person by detecting lips and locally carries out processes such as skin color, gradation, and smoothing.

Japanese Laid-Open Patent Application No. 2001-330882 discloses a camera that changes a detection algorism for detecting subject information corresponding to a shooting mode. Here, for example, focusing and the aperture value are controlled corresponding to the number and the size of the detected face in accordance with the face detection algorism.

U.S. Laid-Open Patent Application No. 2002/101619A1 discloses an image storing device that stores a shot image in connection with discrimination information of the subject stored in advance.

Japanese Laid-Open Patent Application No. 2002-051255 discloses a main-subject-detection camera that detects the main subject and measures the distance to the main subject when a plurality of people are detected by a person-detection means. Here, the person locating at the nearest position, having the largest area, or locating at the center of the image frame is discriminated as the main subject.

Japanese Laid-Open Patent Application No. 2002-333652 discloses an image shooting device that generates a storing signal comparing shot face information with face information stored in advance. When plurality number of faces are there in the image frame, a face corresponding to higher priority face code is focused.

U.S. Laid-Open Patent Application No. 2003/0071908A1 discloses an imaging device that detects a face and sets a distance measuring area or a photometry area to at least a portion of the face. Moreover, it discloses an image-shooting-with-emitting-a-speedlight device that detects a face and emits a speedlight for preventing red-eye.

SUMMARY OF THE INVENTION

The present disclosure is made in view of the aforementioned problems and has an object to provide a digital camera system capable of operating by detecting a feature point, which has not been accomplished, in addition to ordinary functions of a conventional camera.

In order to solve the problems, a digital camera system according to a first embodiment includes a detecting means that detects a given feature point from an image data, a receiving means that receives an order from a user, a selecting means that selects each feature point in accordance with a given order instructed by the receiving means when a plurality of feature points are detected, and a display that displays feature point information identifying the feature point selected by the selecting means. Accordingly, a user can easily select a desired person. In the first embodiment the display may display information regarding the feature point overlaid with the image data is included. In the first embodiment, a face detection means that detects the size of a face from the feature point detected by detecting means may be included. The selecting means selects the face in descending order of the face size detected by the face detection means. In the first embodiment, a distance detection means that detects a distance to the feature point detected by the detecting means may be included. The selecting means selects the feature point in ascending order of the distance detected by the distance detection means, so the user can easily select a desired subject. In the first embodiment, a focus-area-setting means that sets a given area including the feature point detected by the detecting means as a focus area for detecting focus may be included. In the first embodiment, a photometry-area-setting means that sets a given area including the feature point detected by the detecting means as a photometry area may be included.

In another aspect of the present disclosure, a digital camera system may include a detecting means that detects a given feature point from an image data, a display that displays the feature point detected by the detecting means, a receiving means that receives information regarding the feature point displayed by the display, and a memory that stores the feature point and information regarding the feature point. Accordingly, information regarding the feature point together with the feature point may be stored in the memory such as a nonvolatile memory in the digital camera.

The information regarding the feature point may be specific name information. The information regarding the feature point may be priority information determined when a plurality of feature points are detected at a time. A discriminating means that discriminates the priority information, and a selecting means that selects feature point in order of the priority discriminated by the discriminating means may be included. A distance-measuring-area-setting means that sets a distance measuring area for measuring a distance to a subject displayed on the display may be included. The priority information may be a priority among the plurality of feature points upon setting the distance measuring area by the distance-measuring-area-setting means. A photometry-area-setting means that sets a photometry area for measuring lightness of the subject displayed on the display may be included. The priority information may be a priority among the plurality of feature points upon setting the photometry area by the photometry-area-setting means.

The information regarding the feature point may be at least one of color process information and outline correction process information upon storing the image data including the feature point. The information regarding the feature point may be at least one of color process information and outline correction process information upon reproducing the image data including the feature point. A discriminating means that discriminates and displays whether or not at least one of the feature point and information regarding the feature point displayed on the display is stored in the memory may be included.

In another aspect of the present disclosure a digital camera system may include a detecting means that detects a given feature point from an image data, a display that displays the feature point detected by the detecting means, a input means that inputs information regarding the feature point displayed by the display, a instruction means that instructs to store the feature point and information regarding the feature point in connection with the image data, and a memory that stores the feature point, information regarding the feature point, and the image data instructed by the instruction means. Accordingly, information regarding the feature point and the feature point may be stored in the memory in connection with the image data, so it is convenient to select later a subject on the basis of the information regarding the feature point. The information regarding the feature point may be positional information in the image data upon detecting the feature point from the image data.

A memory that stores a first feature point and first specific name information regarding the first feature point, a detecting means that detects a given feature point from an image data, an input means that inputs second specific name information regarding a second feature point detected by the detecting means, and a storing instruction means that instructs to additionally store in the memory the second feature point when the first specific name information and the second specific name information are identical and the first feature point and the second feature point are different may be further included. Accordingly, when the specific memory information regarding the detected subject is the same as the specific name information such as a person's name stored in the memory such as a built-in memory and when a new feature point regarding the person is detected, the detected feature point may be additionally stored in the built-in memory, so that the accuracy of discriminating the person can be increased.

A first memory that stores a first feature point and specific name information regarding the first feature point, a second memory that stores a second feature point and the specific name information in connection with an image data, a storing instruction means that instructs to additionally store in the first memory the second feature point when the first feature point and the second feature point are different may be included. Accordingly, feature points regarding the same specific name information may be additionally stored in advance in the built-in memory from a memory card in which the image data, feature point and the specific name information such as a person's name regarding thereof are stored, so that the accuracy of discriminating the person can be increased.

A first memory that stores a first feature point and specific name information regarding the first feature point, a second memory that stores a second feature point and the specific name information in connection with an image data, and a storing instruction means that instructs to additionally store in the second memory the first feature point when the first feature point and the second feature point are different may be further included. Accordingly, a feature point not detected from the image data stored in the memory card can additionally be stored in the memory card, so the number of feature points regarding the person in the memory card can gradually be increased.

A display that displays an image data, a detecting means that detects a given feature point from the image data, a memory that stores a plurality of feature points in advance, a checking means that checks whether or not the feature point detected by the detecting means is the same as any one of the feature points stored in the memory, and a discriminating-display means that discriminates and displays on the display the checked result checked by the checking means may be included. Accordingly, it becomes possible to discriminate immediately whether the detected feature point has already stored or not. Further, the memory may store at least one of specific name information regarding the feature point and priority information for setting a priority of selection when a plurality of feature points are detected at a time, and the discriminating-display means displays on the display information stored in the memory regarding the feature point may be checked as the same by the checking means.

A detecting means that detects a given feature point from an image data, and a control means that controls the detected feature point in connection with the image data may be further included. Accordingly, the image data and the feature point detected from it can be stored in connection with each other.

A memory that stores a given feature point in an image data in connection with information regarding the given feature point, a detecting means that detects a feature point from an image data, an assigning means that assigns at least one of the given feature point and information regarding the given feature point stored in the memory, an agreement checking means that checks whether or not the feature point detected by the detecting means is the same as the given feature point, a size checking means that checks the size of the feature point checked by the agreement checking means as the same, and a zooming means that zooms in/out a given area including the feature point corresponding to the size of the feature point checked by the size checking means may be further included. Accordingly, when a feature point that is the same as a given feature point such as a person is detected, the feature point's size may be checked, and the feature point may be zoomed in/out to become a given size.

In addition, the agreement checking means may include an overlaid display means that displays a subject corresponding to the feature point checked as the same by the checking means overlaid with a maker. The information regarding the feature point may be specific name information for specifying the feature point. The zooming means may be configured to zoom in/out such that the size of the feature point checked by the size checking means becomes a given range of the size. A position-detecting means that detects the position of the agreed feature point in the shooting image frame may also be included. The zooming means may include a vibration correction lens that corrects vibration upon shooting and a vibration correction lens driver that drives the vibration correction lens such that the agreed feature point comes to a given position in the shooting image frame in response to the detected result of the position-detecting means. Accordingly, in this configuration, a desired subject always comes to a given position (such as the center) of the image frame and is zoomed in/out. A position-detecting means that detects the position of the agreed feature point in the shooting image frame may be included. The zooming means may include an electronic zooming means that zooms in/out electronically such that the agreed feature point comes to a given position in the shooting image frame in response to the detected result of the position-detecting means. Accordingly, the detected feature point may be zoomed in/out to a given position such as the center of the image frame.

A detecting means that detects a given feature point from an image data, a position-detecting means that detects the position of the feature point in a shooting image frame, a vibration correction lens that corrects vibration upon shooting, and a driver that drives the vibration correction lens such that the feature point comes to a given position in the shooting image frame in response to the detected result of the position-detecting means may be further included. Accordingly, the detected feature point can always be positioned optically at a desired position in the shooting image frame without using a camera platform. The given position may locate in the vicinity of the center of the shooting image frame. A memory that stores the given feature point in the image data together with information regarding the given feature point, an assigning means that assigns at least one of the given feature point and information regarding the given feature point stored in the memory, and an agreement checking means that checks whether or not the feature point detected by the detecting means is the same as the given feature point may be further included. The driver drives the vibration correction lens such that the feature point checked by the agreement checking means as the same comes to the given position. Accordingly, in this configuration, a given feature point can always be shot at a desired position such as the center of the image frame.

A shooting instruction means that instructs to shoot a still image of a subject, a detecting means that detects a given feature point from the still image data shot in response to the instruction of the shooting instruction means, a discriminating means that discriminates a state of the given feature point detected by the detecting means, and a warning means that warns in accordance with the discriminated result of the discriminating means may be included. Accordingly, when the shot condition has not been satisfactory after shooting, the warning means may give a warning to a user right away, so that the user can take a measure such as reshooting. The given feature point may be a pupil portion of a person and when the discriminating means discriminates that a pupil has not been detected, the warning means may give a warning. Accordingly, when a person is shot with his/her eyes shut, a warning is given. The given feature point may be an eye or a face outline of a person and when the discriminating means discriminates that the eye or the face outline has a camera shake, the warning means may give a warning. Accordingly, when a person is shot with his/her eyes blinking or with his/her face moving, a warning is given. The detecting means may detect a face of a person before shooting a still image and the given feature point may be a face of a person and when the number of the faces detected by the detecting means before shooting a still image does not coincide with that detected from the shot still image, the warning means may give a warning. Accordingly, when a desired person is shot hiding behind another person, a warning is given.

A shooting instruction means that instructs to shoot an image of a subject, a detecting means that detects a given feature point from the image data shot in response to the instruction of the shooting instruction means, a discriminating means that discriminates a state of the given feature point detected by the detecting means, and a reshooting instruction means that instructs the shooting instruction means to reshoot the subject in accordance with the discriminated result of the discriminating means may be further included. Accordingly, when a shot condition has not been satisfactory after shooting, the subject is automatically reshot. The given feature point may be, for example, a pupil portion of a person and when the discriminating means discriminates that a pupil has not been detected, the reshooting instruction means instructs to reshoot the subject. Accordingly, when a person is shot with his/her eyes shut, the person is automatically reshot. The given feature point may be, for example, an eye or a face outline of a person and when the discriminating means discriminates that the eye or the face outline has a camera shake, the reshooting instruction means instructs to reshoot the subject. Accordingly, when a person is shot with his/her eyes blinking or with his/her face moving, the person is automatically reshot. The detecting means may be configured to detect a face of a person before shooting an image and the given feature point may be a face of a person and when the number of the faces detected by the detecting means before shooting an image does not coincide with that detected from the shot image, the reshooting instruction means may instruct to reshoot the subject. Accordingly, when a desired person is shot hiding behind another person, the person is automatically reshot.

A detecting means that detects a given feature point from an image data, a memory that stores a plurality of color reproduction parameters for carrying out color reproduction of the whole image data, a discriminating means that discriminates a face of a person from the feature point detected by the detecting means, a size comparator that compares the size of the face discriminated by the discriminating means with a given value, and a selecting means that selects a color reproduction parameter giving priority to skin color among the plurality of color reproduction parameters when the size comparator discriminates that the size of the face is the given value or more may be included. Accordingly, when the detected face size is a given value or more, color reproduction parameter giving priority to skin color may be selected.

A detecting means that detects a given feature point from an image data, a memory that stores a plurality of color reproduction parameters for carrying out color reproduction of the whole image data, a discriminating means that discriminates a face of a person from the feature point detected by the detecting means, a number comparator that compares the number of the faces discriminated by the discriminating means with a given value, and a selecting means that selects a color reproduction parameter giving priority to skin color among the plurality of color reproduction parameters when the number comparator discriminates that the number of the faces is the given value or more may be included. Accordingly, when the number of detected faces is a given value or more, color reproduction parameter giving priority to skin color may be selected.

An imaging device that images a subject, an aperture stop that controls light quantity incident on the imaging device, a detecting means that detects a given feature point from an image data output from the imaging device, a discriminating means that discriminates the size and the number of the faces from the feature point detected by the detecting means, and a control means that controls the aperture value of the aperture stop to become small when the discriminating means discriminates that the face size detected by the detecting means is a first given value or more and a second given value or less may be further included. Accordingly, when the size of the detected face is large to a certain extent and when the number of the detected face is three to four or less, the image may be discriminated as a portrait photograph and shot by setting small aperture value to obtain an image with shallow depth of focus.

A detecting means that detects a given feature point for discriminating a subject from an image data, a setting means that sets a given setting condition corresponding to at least one item of photometry, measuring distance and white balance each including a plurality of setting conditions upon shooting, and an instructing means that instructs the setting means to set different setting condition in accordance with the detected result of the detecting means may be included. Accordingly, the best setting condition in accordance with the detected subject can be set.

A discriminating means that discriminates the subject may be further included. When the setting condition is any one of a condition suitable for a landscape, a distant subject, and a night view and when the discriminating means discriminates a person as the subject, the instructing means may be configured to instruct the setting means to set a setting condition suitable for shooting a person. Accordingly, in the case of the aperture value is large for obtaining large depth of focus as an example suitable for shooting a landscape, when a person is detected in the shooting image frame, the shooting mode may be immediately shifted to a mode suitable for shooting a person setting the aperture vale to small obtaining shallow depth of focus. When the setting condition is suitable for shooting a person and when the detecting means does not detect a person as the subject, the instructing means may be configured to instruct the setting means to set any one of a condition suitable for a landscape, a distant object and a night view. In the case setting a shooting mode suitable for shooting a person, when a person is not detected in the shooting image frame, the shooting mode may be shifted to that suitable for shooting a landscape. A warning means that gives a warning when the setting condition is suitable for shooting a person and when the detecting means does not detect a person as the subject may be further included.

An AF means that controls focusing on the basis of a signal output from a given AF area in an image data, a detecting means that detects a given feature point from the image data, a face discriminating means that discriminates a face of a person from the feature point detected by the detecting means, a position discriminating means that discriminates a position of the face discriminated by the face discriminating means, and a setting means that sets a given second area as an AF area when the position discriminating means discriminates that the face position is outside of a given first area may be included. Accordingly, when a subject is located on the periphery of the shooting image frame, the AF area may be set to a predetermined central area.

A shooting lens that is composed of a zoom lens and a focusing lens for shooting a subject, a position sensor that detects a position of the zoom lens, a detecting means that detects a given feature point and information regarding the feature point from an image data shot by the shooting lens, and a calculator that calculates a distance to the subject on the basis of information regarding the feature point detected by the detecting means and the position of the zoom lens detected by the position sensor may be included. Accordingly, the distance to the subject may be calculated on the basis of the information regarding the detected feature point and the zoom position. The information regarding the feature point may be, for example, at least one of the face size and the pupil distance. A restriction means that restricts a moving range of the focusing lens to a given range on the basis of the distance to the subject calculated by the calculator may be further included. Accordingly, by restricting the focus range of the focusing lens, the AF movement can be carried out faster, and even if a high contrast backdrop exists, the AF movement cannot be affected by it. An aperture stop that controls light quantity incident on the shooting lens, and an aperture determining means that determines an aperture value of the aperture stop such that when a plurality of faces are detected by the detecting means, a given face among the plurality of faces comes in focus on the basis of the distances to the plurality of faces calculated by the calculator may be further included. Accordingly, by varying the aperture value in accordance with the calculated distance to each face, a desired face can be located within the depth of focus of the shooting lens.

An illumination means that illuminates a subject upon shooting the subject, a detecting means that detects a given feature point from an image data, a distance calculator that calculates a distance to the feature point on the basis of the feature point detected by the detecting means, and a illumination quantity setting means that sets an illumination light quantity of the illumination means on the basis of the distance calculated by the distance calculator may be included. Accordingly, the light quantity of the speedlight can be set in accordance with the distance to the detected feature point.

A plurality of photometry areas that measure luminance of the subject, and an exposure setting means that sets an exposure condition upon shooting on the basis of an output of a given photometry area among the plurality of photometry areas may be further included. Accordingly, a proper exposure can be provided to both the detected feature point and the backdrop even if it is backlight condition.

A size detector that detects a face size or a pupil distance from the feature point detected by the detecting means, and a lens position sensor that detects the focal length of the zoom lens may be further included. The distance calculator may calculate a distance to the feature point on the basis of the face size or the pupil distance detected by the size detector and the focal length of the zoom lens detected by the lens position sensor. A discriminating means that discriminates whether or not the distance is within the controllable exposure range of the illumination means on the basis of the distance to the subject calculated by the distance calculator, and a warning means that gives a warning when the discriminating means discriminates that the distance is out of the controllable exposure range may be further included.

A main illumination means that illuminates a subject upon shooting the subject, an auxiliary illumination means that illuminates the subject with an auxiliary illumination in advance, a detecting means that detects a given feature point from an image data, and a setting means that sets an illumination light quantity of the main illumination means on the basis of a reflection light from the feature point illuminated with the auxiliary illumination by the auxiliary illumination means may be included. Accordingly, since the illumination light quantity upon shooting is determined in accordance with the reflected light from the feature point, the best exposure can be provided to the feature point. The feature point may be, for example, a face portion of a person.

An imaging device that shoots an image of a subject, a memory that stores an image data, a detecting means that detects a given feature point from the image data, an instructing means that instructs the imaging device to shoot the subject for storing in the memory, and a controller that controls the detecting means not to carry out detecting procedure to an image data output from the imaging device before the instructing means gives the instruction may be included. The detection is not carried out to the image data output from the imaging device simply for monitoring purpose before shooting the image data for storing the memory such as a memory card. After the shutter release button is pressed, the detection may be carried out to the image data output for storing before storing the image data. Accordingly, a precious shutter chance is not given away.

A processing means that processes at least one of white balance process and outline enhancement process on the basis of the feature point detected by the detecting means in response to the instruction given by the instructing means may be further included. A controller that controls the memory to store the image data processed by the processing means may be further included.

A memory that stores a given feature point together with information regarding the feature point detected from an image data, a display that displays either the feature point or the information regarding the feature point stored in the memory, and a deleting means that deletes from the memory at lest a portion of the feature point or the information regarding the feature point displayed on the display may be included. Accordingly, the feature point or information regarding the feature point can be deleted from the memory such as the inside memory or the outside memory card.

A memory that stores a given feature point together with information regarding the feature point detected from an image data, a display that displays either the feature point or the information regarding the feature point stored in the memory, and a controller that changes at least a portion of the feature point or the information regarding the feature point displayed on the display and stores to the memory may be included. Accordingly, the feature point or information regarding the feature point can be changed from the memory such as the inside memory or the outside memory card.

Other features and advantages according to the present disclosure will be readily understood from the detailed description of the preferred embodiments in conjunction with the accompanying drawings.

BRIEF DESCRIPTION OF THE DRAWINGS

FIG. 13 is a drawing explaining a storing state of a feature point and feature information.

FIG. 14 is a drawing explaining a storing state of a image data and feature information attached thereof.

DESCRIPTION OF THE PREFERRED EMBODIMENTS

Embodiments of the present disclosure are going to be explained below with reference to accompanying drawings.

Figure 1:
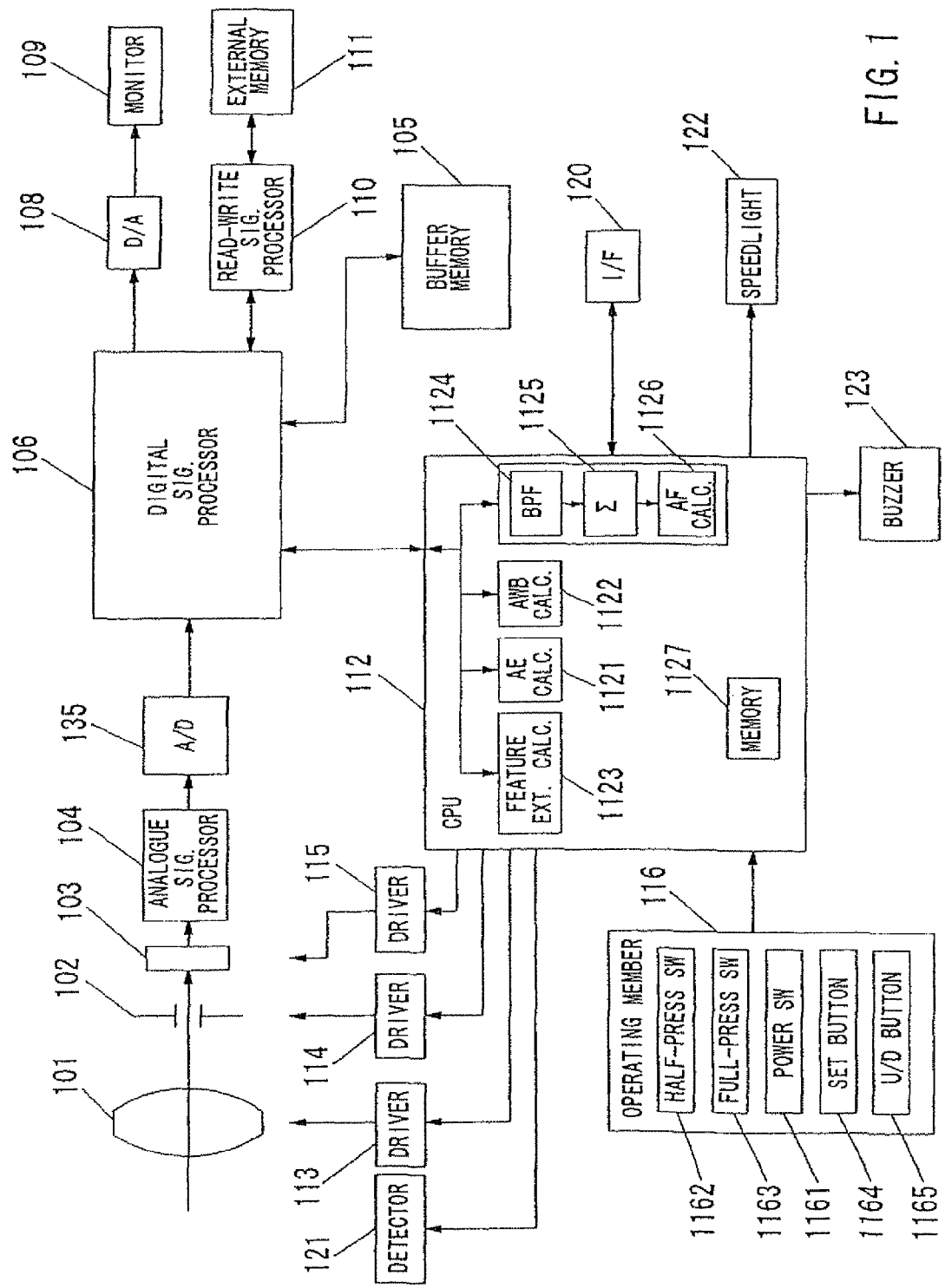
FIG. 1 is a block diagram explaining main features of a digital camera system according to the first embodiment.

FIG. 1 is a block diagram explaining main features of a digital camera system according to the present disclosure.

A shooting lens 101 is composed of a zoom lens for varying the focal length continuously, a focusing lens for adjusting focal point, and a VR (vibration reduction) lens for correcting a camera shake upon shooting. These lenses are driven by a driver 113. The driver 113 is composed of a zooming lens driving mechanism and its driving circuit, a focusing lens driving mechanism and its driving circuit, and a VR lens driving mechanism and its driving circuit. Each mechanism is controlled by a CPU 112. A detector 121 detects positions of the focusing lens and the zooming lens and transmits each lens position to the CPU 112.

The shooting lens 101 forms a subject image on an imaging surface of an imaging device 103. The imaging device 103a is a photoelectric converter such as a CCD-type or MOS-type solid-state imaging device outputting electric signals in response to the intensity of the subject image formed on the imaging surface. The imaging device 103 is driven by a driver 115 controlling timing of outputting signals therefrom. An aperture stop 102 is arranged between the shooting lens 101 and the imaging device 103. The aperture stop 102 is driven by a driver 114 having a stopping mechanism and its driving circuit. An imaging signal from the solid-state imaging device 103 is input to an analogue signal processor 104 and processed such as a correlated double sampling (CDS) process and the like. The imaging signal processed by the analogue signal processor 104 is converted from an analogue signal to a digital signal by an A/D converter 135.

Figure 22:
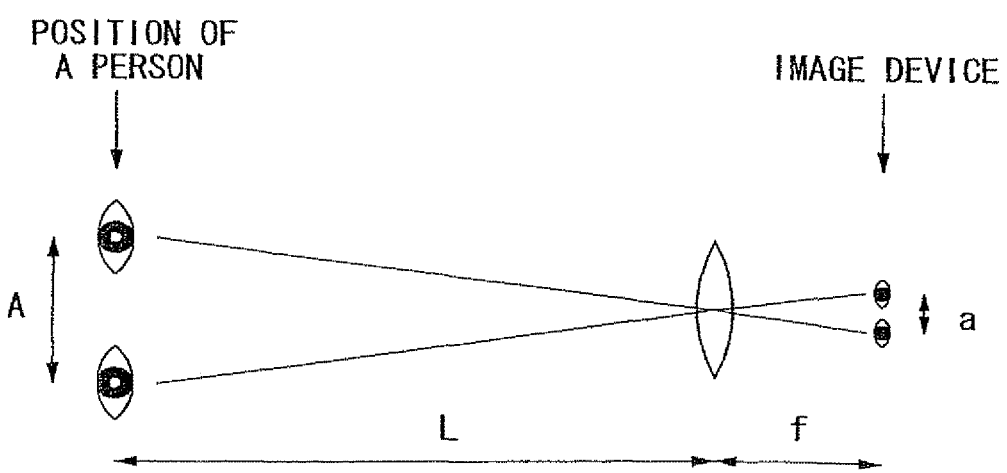
FIG. 22 is a drawing explaining the case when the distance to the person is calculated on the basis of the pupil distance of the detected person and the focal length of the zoom lens.

The A/D converted signal is carried out various image processing such as edge enhancement, gamma correction and the like by a digital signal processor 106. A plurality of parameters for edge enhancement are provided in advance and the optimum parameter is selected in accordance with the mage data. In the digital signal processor 106, a luminance/color difference signal generating circuit and the like carrying out processing for recording are included and parameters for generating these signals are also provided. Accordingly, the most suitable parameter is selected from these plurality of parameters in accordance with a shot image. The plurality of parameters for edge enhancement and color reproduction are stored in a memory 1127, explained later, in which the best suited parameter is selected by the CPU 112. A buffer memory 105 is a frame memory on which data of a plurality of image frames shot by the imaging device 103 and temporally stores the A/D converted signals. The data stored in the buffer memory 105 is read out by the digital signal processor 106, carried out each processing described above, and, after processing, stored again in the buffer memory 105. The CPU 112 is connected with the digital signal processor 106 and drivers 113 through 115, and carries out sequential control of the shooting movement of the camera system. An AE calculator 1121 in the CPU 112 carries out auto-exposure calculation on the basis of the image signal from the imaging device. An AWB calculator 1122 carries out auto-white-balance calculation for setting parameters for white balance. A feature-detection calculator 1123 stores features such as a shape, position, size and the like of a person in the image data in the memory 1127 on the basis of a given algorism, calculates an approximate distance to each detected person on the basis of the sizes of the detected face, pupil distance, and the like and the focal length of the zoom lens detected by the detector 121, and stores it to the memory 1127 together with the detected time and date. Here, the method of calculating the distance is explained below with reference to FIG. 22. FIG. 22 shows the case when the distance to the person is calculated on the basis of the pupil distance of the detected person. The reference symbol "A" denotes an average value of the pupil distance of a grown-up man, "a" denotes a detected pupil distance formed on the imaging device, "L" denotes a distance between a shooting lens and the person, and "f" denotes the focal length. The following proportional expression is easily derived from FIG. 22:

$$A/L=a/f$$

Therefore, the distance to the person L becomes L=(A/a)·f. In this manner, detected features and the distances to the features calculated on the basis of the detected features are temporally stored in the memory 1127. Then, the user selects features to be saved among such stored features and registers them by selecting. The contents and the method of the registration is explained later in detail with reference to FIG. 13.

A band-pass filter (BPF) 1124 picks up high frequency component of a given frequency range on the basis of a shooting signal in the focus detection area arranged in the imaging area. The output of the BPF 1124 is input to a following adder 1125, and, here, the absolute value of the high frequency component is integrated as a focus evaluation value. An AF calculator 1126 carries out the AF calculation by a contrast method on the basis of these focus evaluation values. On the basis of the calculation result of the AF calculator 1126, the CPU 112 adjusts focus range of the shooting lens 101 and carries out focusing.

On an operating member 116 connecting with the CPU 112, a power switch 1161 for turning on/off the power of the camera system, a half-press switch 1162 and a full-press switch 1163 for turning on/off in response to the shutter release button, a setting button 1164 for selecting various kinds of contents for shooting mode, an Up/Down button 1165 for renewing reproducing images, and the like. The setting button 1164 uses the U/D button together to set a name to a selected feature by selecting an alphabet, a numeral, and the like. Except this function, the U/D button 1165 is also used for selecting a desired person from a plurality of detected people, and for manually driving the zoom to the telephoto/wide-angle side upon shooting.

When the luminance of a subject is low, a speedlight 122 is emitted. Upon shooting with using the speedlight, the speedlight 122 also has a monitor pre-flash function that prevents or reduces the subject's eyes becoming red or measures the luminance of the subject in advance by emitting an AF-assist illuminator when the luminance of the subject is low. The reference number 123 denotes a sounding body such as a buzzer for warning something wrong with the camera system by a sound. In the memory 1127, a peak value of the evaluation value detected by the result from the AF calculation and corresponding lens position are stored in addition to the aforementioned feature information. Image data carried out various processing by the digital signal processor 106 is stored in an external memory 111 such as a memory card and the like through a read-write signal processor 110 after temporally storing in the buffer memory 105. When the image data is stored in the external memory 111, generally a given compression format such as a JPEG format is used for compressing the image data. The read-write signal processor 110 carries out data compression upon storing the image data in the external memory 111 and data expansion upon reproducing a compressed image data from an external memory 111 or transferred from another camera system. The reference number 120 denotes an interface for carrying out data communication with an external device such as a digital camera and the like by radio transmission or connected line. Such interface may exist a plurality numbers at a time.

A monitor 109 is an LCD display for showing a shot subject image or showing various setting menus upon shooting/reproducing. This is also used for reproducing an image data stored in the external memory 111 or transferred from another camera system. When an image is shown on the monitor 109, an image data stored in the buffer memory 105 is read out and converted a digital image data into an analogue image signal by a D/A converter 108. Then, an image is shown on the monitor 109 by using the analogue image signal.

The contrast method that is an AF control method used by the digital camera is explained. In this method, focusing is carried out by using the fact that degree of defocusing and a contrast of an image has a mutual relation and the contrast of an image becomes maximum when the image comes into focus. The magnitude of contrast can be evaluated by the magnitude of high frequency component of the imaging signal. In other words, the high frequency component of the imaging signal is detected by the BPF 1124, the absolute value of the high frequency component is integrated by the adder 1125, and let the result be a focus evaluation value. As described above, the AF calculator 1126 carries out AF calculation on the basis of the focus evaluation value. CPU 112 adjusts the focusing position of the shooting lens 101 by using the result of the calculation.

Figure 2:
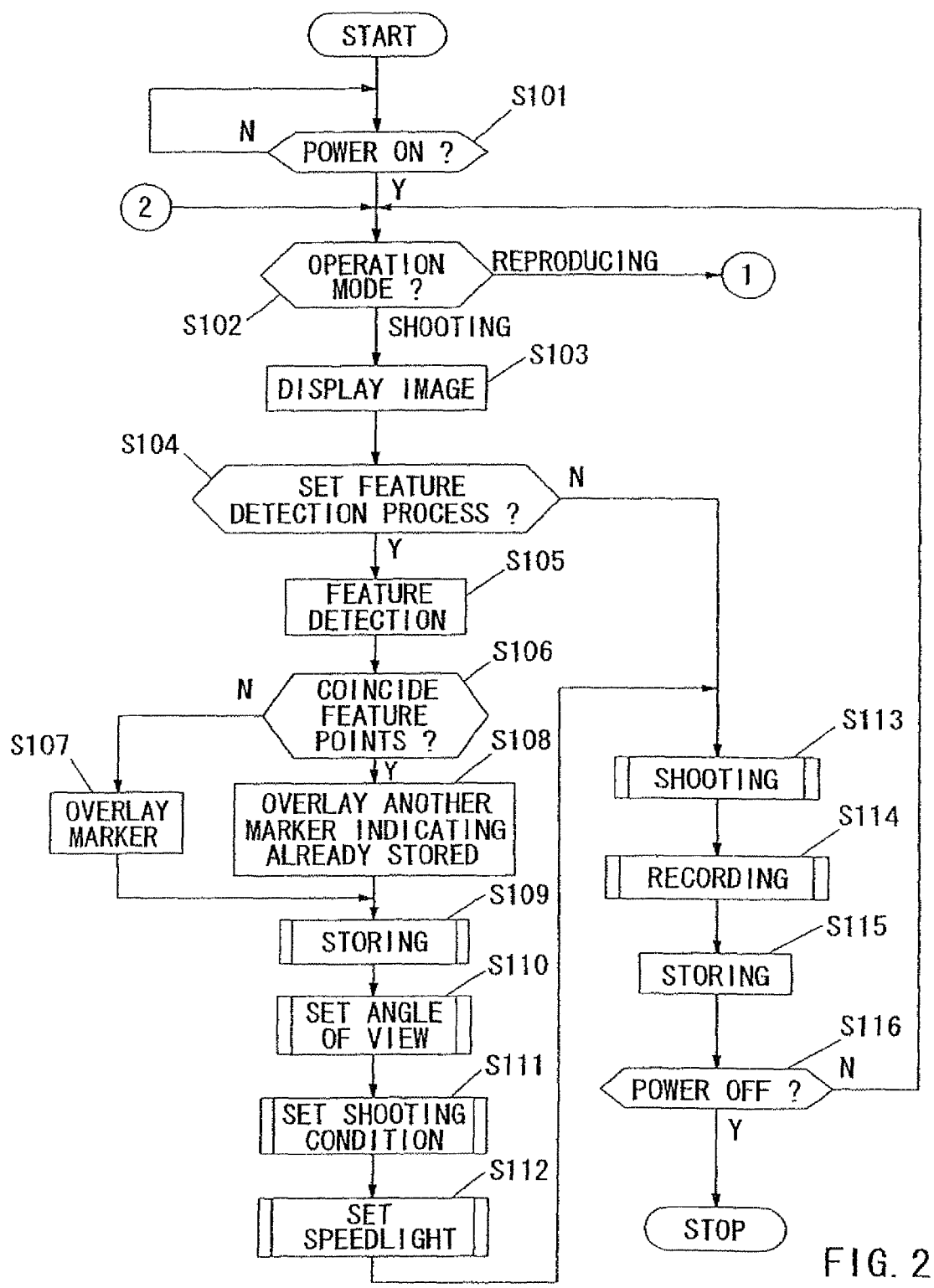
FIG. 2 is a flow chart explaining the total sequence of actions of the digital camera according to the first embodiment.
Figure 3:
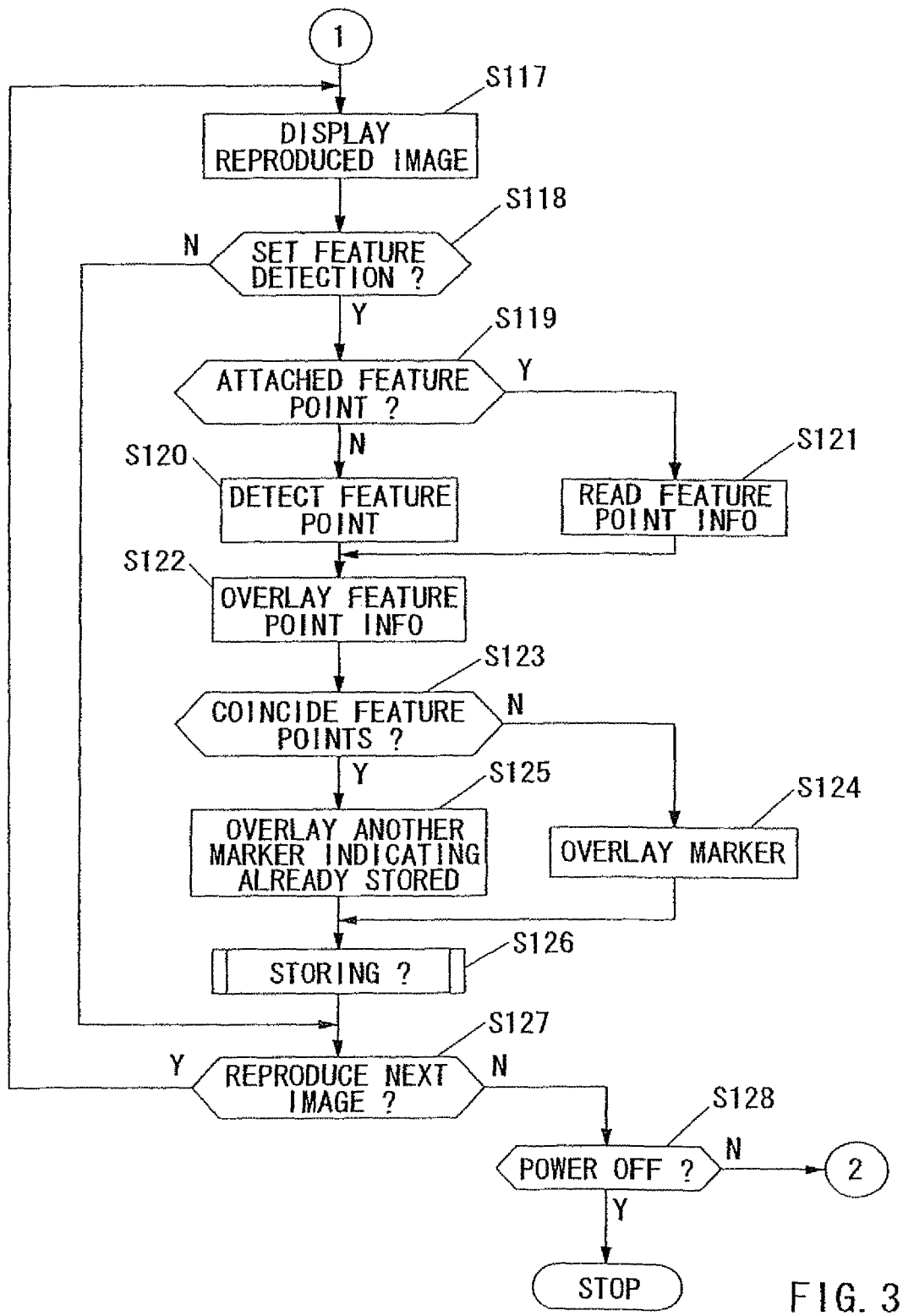
FIG. 3 is a flow chart explaining a sequence of actions of the digital camera according to the first embodiment in which the mode of the digital camera is set to reproduction mode.

FIGS. 2 and 3 are flow charts showing the total sequence of actions of the digital camera having a face recognition function. In FIG. 2, in step S101, when the digital camera detects that the power of the digital camera is turned on by the power switch 1161, the flow proceeds to a step S102. In step S 102, the operation mode of the digital camera is checked. Here, whether the mode set by the setting button 1164 is set to a shooting mode for shooting a subject or to a reproducing mode for reproducing an image data stored in the memory card is discriminated. When the mode is set to the reproducing mode, the flow proceeds to step S117 shown in FIG. 3. When the mode is set to the shooting mode, the flow proceeds to step S103. In step S103, the subject image is displayed videos on the LCD monitor 109. In step S104, whether the displayed image is set to carry out a feature detection process for detecting feature points in accordance with a given algorism or not is discriminated. The setting button 1164 is used for this setting. When the image is not set to carry out a feature detection process, the flow proceeds to step S113 and ordinary shooting process is carried out. When the image is set to carry out a feature detection process, the flow proceeds to step S105 and feature points and their positional information are detected from every one or two to three frames of the video image data displayed on the LCD monitor 109. The detected feature points are such as a face, eyes, pupils, eyebrows, a nose, a mouth, ears, hands, legs, and outline of eyeglasses and its direction, position, and dimension. Moreover, sex, race and age of the person can be discriminated by detecting hairstyle, bone structure, and the kind of clothes of the person. Furthermore, not only a person but also general subject of an animal such as a dog, a cat, and a bird, and houses and cars can be detected. The following explanation is mainly in the case of detecting features of a person.

Figure 15:
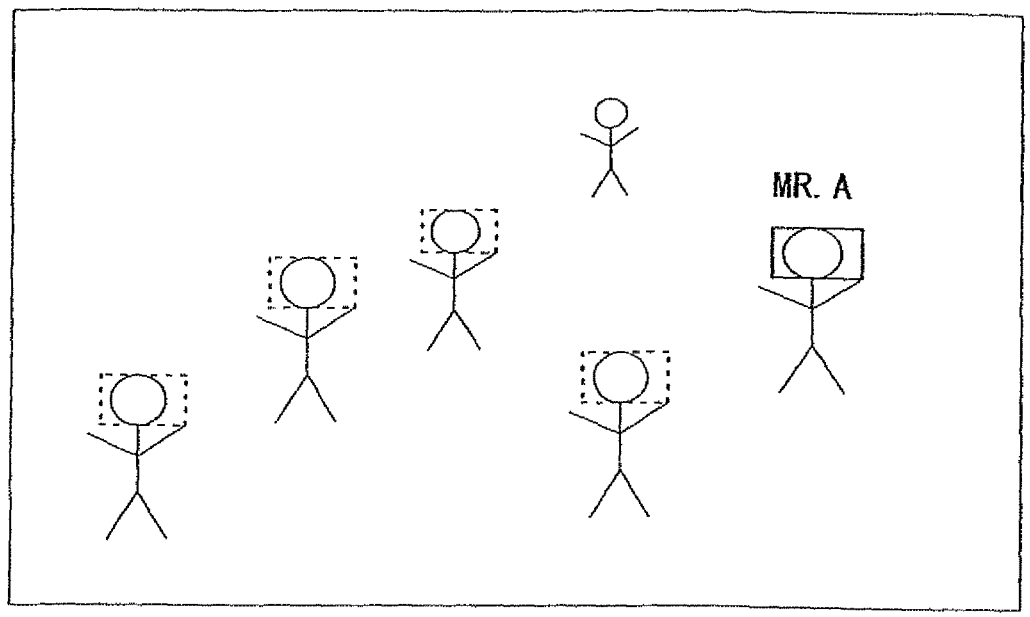
FIG. 15 is a drawing showing markers overlaid each detected feature point discriminating with different marker.

In step S106, whether there is any coincident feature point between a plurality of detected feature points and those stored in the memory 1127 of the digital camera in advance is checked. When there is no coincident feature point, the flow proceeds to step S107. In step S107, a marker indicating that a feature point is detected is overlaid with the image displayed on the LCD monitor 109. On the other hand, when there is a coincident feature point, then the flow proceeds to step S108. In step S108, another maker different from the other makers indicating that the feature point has already stored is overlaid. An example of the case is shown in FIG. 15. FIG. 15 shows that among the six people in the frame a person's face is too small to detect a feature point as a face, the other five people are detected their feature points as respective faces, and a person among them is detected as one already stored. The faces of four people who are simply detected their feature points are enclosed with a broken line and the face of a person whose feature point has already been stored is enclosed with a solid line. Moreover, when personal information such as a name corresponding to the feature point has already been stored as feature point information, it is also shown as FIG. 15. Accordingly, identification of the subject is confirmed all the more. In this embodiment, priority on selecting AE area or AF area explained later is also stored as feature information. An example of recording in the memory 1127 regarding a feature point is shown in FIG. 13. In FIG. 13, feature points corresponding to respective names such as Mr. A, Ms. B, and Ms. C, and a feature point that has no-name such as Mr. Unknown are stored in turn. In the stored contents of Mr. A, the aforementioned priority upon selecting AE area and AF area is set to 1.

Accordingly, for example, when Mr. A and Ms. C are detected simultaneously in the same shot image frame, an area including Mr. A takes priority to be set as an AE area or an AF area. The order of priority can be changed arbitrarily. As Mr. A's feature point information, the date when Mr. A's feature point information is stored is then stored as a registration date. The registration date indicated by (1) is the date Mr. A is stored in the first place. The dates indicated by (2) and (3) are the dates Mr. A is additionally stored in different states where facing sideway, turning backward, wearing eyeglasses, or the like.

By storing a plurality of feature points as the same person in accordance of wearing and not wearing eyeglasses or beard, accuracy of identifying a person from the detected feature points is increased. Regarding such feature points, the contents can be displayed on the LCD monitor 109 and added or deleted arbitrarily. In addition to the priority and the registration date, simple comments, effective processing (such as white balance setting, outline compensation, and the like) upon storing or reproducing when the feature point is detected, the distance to the feature point, and the like may also be stored. The actual data of such feature point set to be stored is stored in the feature point data area.

Step S109 through step S114 show processing peculiar to the detected feature point. Even if a feature point is detected, you can arbitrarily choose a step to be applied among respective steps by using the setting button 1164. The following explanation corresponds to a case that all steps are selected. In step S109, the detected result shown on the display is stored. The storing procedure in step S109 is explained later in detail with reference to FIG. 4. After finished storing, the flow proceeds to step S110 for setting an angle of view. By setting in step S110, even if a plurality of people are there in a shot image frame, a subject to be aimed is automatically detected and is zoomed up to be placed at the center of the frame. The function is particularly effective upon shooting your child in a sports meeting or a concert. The step S110 is explained later in detail with reference to FIG. 5. In step S111, shooting conditions are set. When a plurality of people are there in a shooting image frame, an area including a person to be shot is set as an AF area or an AE area, or an aperture stop corresponding to the size or the number of the people is set. The step S111 is explained later in detail with reference to FIGS. 6 through 8. In step S112, a speedlight is set. The step S112 is explained later in detail with reference to FIG. 9. The steps from S109 through S112 are settings before shooting, so the order of the settings can be changed arbitrarily in accordance with the shooting image frame and the contents of each setting also can be changed at each step.

In step S113, a subject is shot. In this step, by detecting people, the number of shooting frames is automatically set, and the actual exposure is carried out in response to the movement of the people upon shooting. The procedure of the shooting steps is explained later in detail with reference to FIGS. 10 and 11. After shooting recording procedure is carried out in step S114. In this step, an outline of the face of a subject is detected and processes such as changing white balance, and automatically reducing freckles and moles are carried out. The step S114 is explained later in detail with reference to FIG. 12. In step S115, the processed image data and the feature point information are combined as a single file to be stored in the memory card. In step S116, whether the power is turned off or not is discriminated. When the power is not turned off, the flow returns to step S102 and discriminates the operation mode of the digital camera. When the power switch is turned off, the sequence is completed.

In step S102, when reproduction mode has been set, the flow proceeds to step S117 sown in FIG. 3. In step S117, an image data stored in the memory card 111 is reproduced and displayed on the LCD monitor 109. The reproduced image may be a still image or a video image. In step S118, similar to step S104, whether the displayed image is set to carry out a feature detection process or not is discriminated. When the mode is not set to carry out a feature detection process, the flow proceeds to step S127 to carry out ordinary reproduction. When the mode is set to carry out a feature detection process, the flow proceeds to step S119. In step S119, whether feature point information is attached to a reproducing image data or not is discriminated. When feature point information is not attached, the flow proceeds to step S120. In step S120, a feature point is detected from the image data similar to step S105 and the flow proceeds to step S122. When feature point information is attached, the flow proceeds to step S121. In step S121, feature point information attached to a reproducing image data is read out and the flow proceeds to step S122. In step S122, the detected feature points, read out feature points, and feature information are overlaid with the reproduced image. Instead of the feature points, the aforementioned marker or an icon may be overlaid.

In step S123, whether there is any coincident feature point between a plurality of detected feature points and those stored in the memory 1127 of the digital camera is checked. Similar to step S106, when there is no coincident feature point, the flow proceeds to step S124. In step S124, a marker indicating that a feature point is detected is overlaid with the image displayed on the LCD monitor 109. On the other hand, when there is a coincident feature point, then the flow proceeds to step S125. In step S125, another maker different from the other makers indicating that the feature point has already stored is overlaid. In step 126, the detected result shown on the display is stored. The storing procedure is explained later with reference to FIG. 4. After completion of storing in step S126, the flow proceeds to step S127. In step S127, whether the next image is reproduced or not is discriminated. When the next image is selected by the U/D button 1165, the flow returns to step S117. On the other hand, when the next image is not selected, the flow proceeds to step S128. In step S128, whether the power switch is turned off or not is discriminated. When the power switch is not turned off, the flow returns to step S102 shown in FIG. 2. When the power switch is turned off, the flow proceeds to the end.

<Storing Feature Point Information>

Figure 4:
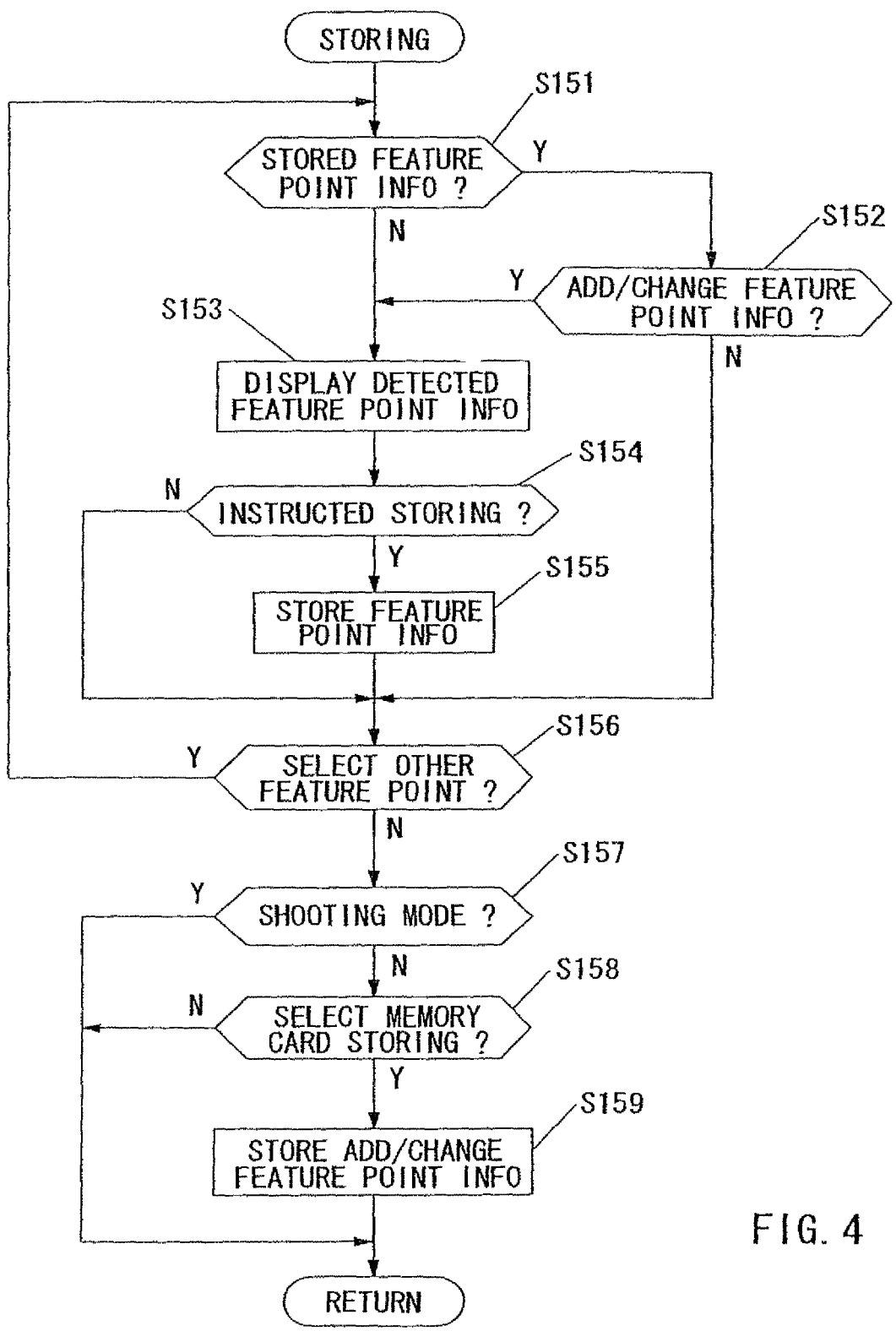
FIG. 4 is a flow chart explaining a sequence for storing feature point information.

The step for storing feature point information is explained with reference to FIG. 4. The step for storing feature point information shown in FIG. 4 is similar to the aforementioned step S109 in FIG. 2 and step S126 in FIG. 3. When the image data is a shot image data, in step S151, whether there is any coincident feature point between detected feature points and those stored in the memory 1127 of the digital camera is checked. When the image data is a reproduced image data, in step S151, feature point or feature point information attached to the reproduced image data is read out. Whether there is any coincident feature point or feature point information between those of the read out image data and those stored in the memory 1127 in the form explained in FIG. 13 is checked. When feature point or feature point information is not attached to the reproduced image data, feature point is detected from the reproduced image data similar to the shot image data.

Here, feature point information attached to the image data is explained with reference to FIG. 14. In the image data file DSC002 as shown in FIG. 14, feature point information and feature point data are additionally stored beside the actual image data. In the case of FIG. 14, two people of Mr. A and Ms. C are stored as feature point information. As for the stored contents, priority, the date when Mr. A or Ms. C is detected in the image data, and the position of center of gravity of the feature point are stored. As for Mr. A, in addition to those, two other feature points detected from other image data than the image data DSC002 is additionally stored. Similar to FIG. 13, simple comments or processing upon recording/reproducing may be stored. Moreover, the distance to the feature point calculated by the feature-detection calculator 1123 may be stored. The data contents of the feature point information can be changed, added, and deleted arbitrarily. The actual feature point data regarding Mr. A and Ms. C is stored in turn in the feature point data area shown below.

In step S151, when the feature point of a shot image data or the feature point or the feature point information of a reproduced image data has already been stored in the memory 1127, the flow proceeds to step S152. In step S152, whether or not the already stored feature point or feature point information is to be changed or added is checked. In particular, detected person's name or priority is added or changed. When there is no change or addition in step S152, the flow proceeds to step S156. On the other hand, there is any change or addition, the flow proceeds to step S153.

In step S151, when the feature point of a shot image data or the feature point or the feature point information of a reproduced image data has not been stored in the memory 1127, the flow proceeds to step S153. In step S153, detected features point and the feature point information to be stored are shown on the LCD display 109. In step S154, whether the displayed feature point and feature point information have been instructed to be stored or not is checked. In principle, a newly detected feature point is additionally stored together with feature point information in the memory 1127 in step S155 unless the newly detected feature point is completely identical to that stored in the memory 1127. The storing instruction can be carried out, for example, by the setting button 1164 by means of selecting a storing execution shown on the LCD display 109 (not shown). Accordingly, accuracy in identifying a person gradually becomes high. When the detected feature point has already been stored or when a totally unrelated feature point for the user is detected, it is not stored, so the flow proceeds to step S156. In step S156, whether the other feature points of the same image frame are to be stored or not is checked. When another feature point is selected, the flow returns to step S151 and stores it with the same procedure as before.

When any other feature point is not selected, the flow proceeds to step S157. In step S157, an operation mode of the digital camera is discriminated. When a shooting mode has been set, the storing procedure is completed. The storing operation is carried out every time when the displayed image is changed. When a reproduction mode is set, the flow proceeds to step S158. In step S158, whether the memory card storing execution is selected by the setting button 1164 or not is checked (not shown). When a storing instruction is selected, the flow proceeds to step S159. In step S159, a changed or a newly added feature point or feature point information is stored attaching with the original image in the memory card. When a storing instruction is not selected, the storing procedure is completed without renewing additional information.

<Setting an Angle of View for Shooting>

Figure 5:
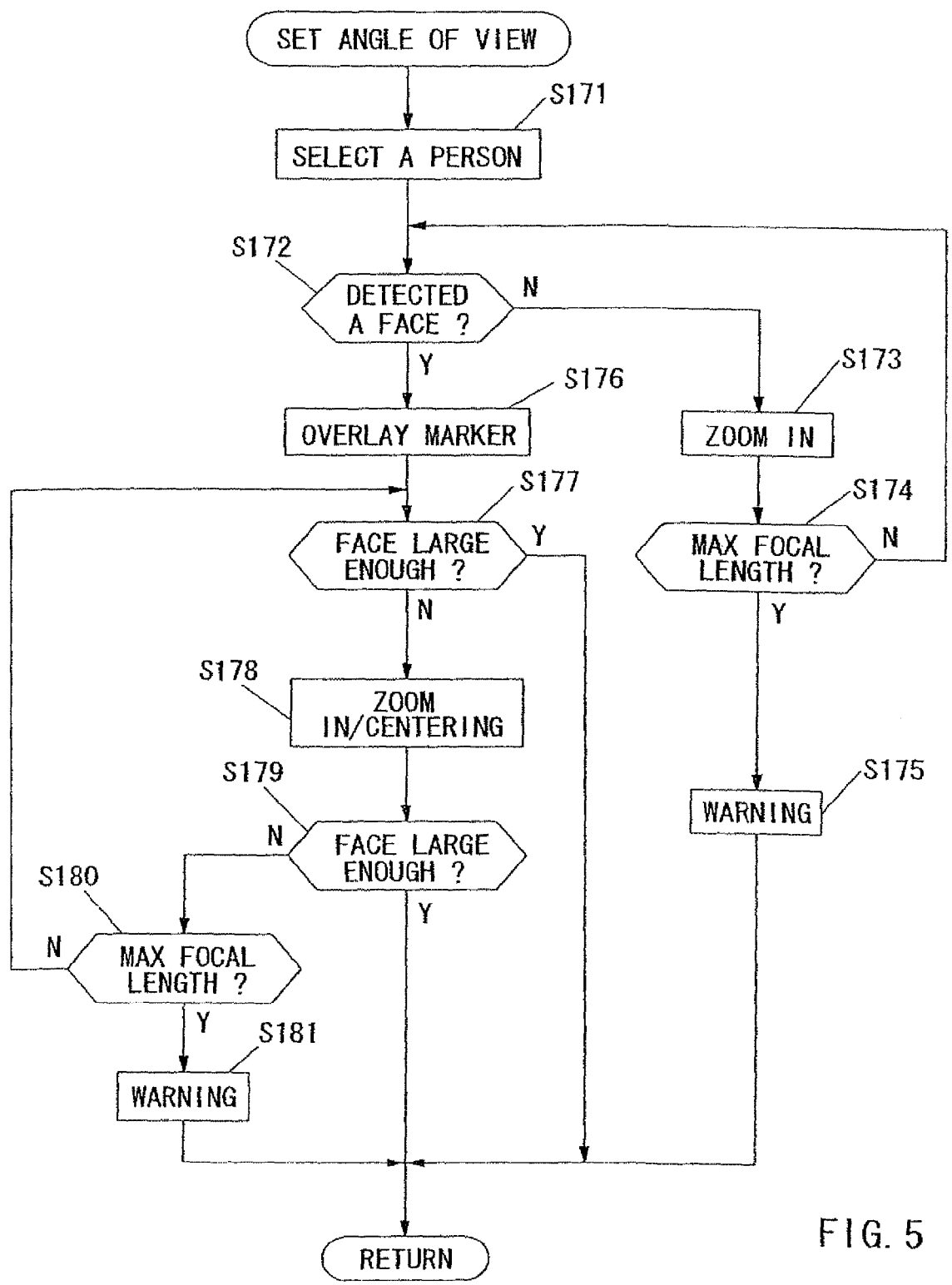
FIG. 5 is a flow chart explaining a sequence for setting shooting angle of view.

The setting an angle of view for shooting in step S110 shown in FIG. 2 is explained with reference to FIG. 5. This is particularly convenient setting sequence for shooting, for example, your child, Ms. C, in a sport meeting. In step S171, a person to be shot (for example, Ms. C) is selected as a priority shooting person in advance by the setting button 1164 from the feature point information stored in the memory 1127 on the basis of proper name information. The person stored as the priority shooting person is given priority over the priority listed on the aforementioned feature point. In step S172, whether the person (mainly the face of the person) is detected in the shooting image frame is checked. When it is not detected, the flow proceeds to step S173. In step S173, CPU 112 instructs the driver 113 to zoom in toward a telephoto side of the zoom lens. The zoom in operation may be carried out manually or automatically. In step S174, whether the zoom lens reaches the maximum focal length position or not is checked. When the zoom lens does not reach the maximum focal length position, the flow returns to step S172 repeating the sequence until the person is detected. In step S174, when the zoom lens has reached the maximum focal length position, the flow proceeds to step S175. In step S175, a warning that the person is not found (not shown) is displayed on the LCD monitor 109 and the procedure of setting an angle of view for shooting is completed. When the shooting image frame is changed upon changing shooting direction, the procedure starting from step S172 is repeated.

In step S172, when the face of the person is detected, the flow proceeds to step S176. In step S176, a maker is overlaid with the face of the personas shown in FIG. 15. From the displayed image, the user checks whether the face of the person to be set in advance is there in the shot image frame or not. When the face of the person is there, the user can easily capture the person to be shot in the image frame by moving the image frame. In step S177, whether the face size of the person to be set in the image frame is a given size or more is checked. When the face size exceeds the given size, the flow is completed. On the other hand, when the face size is less than the given size, the flow proceeds to step S178. In step S178, CPU 112 automatically zooms in the zoom lens. At that time, the center of gravity of the detected subject is controlled to stay in the vicinity of the center of the image frame by simultaneously driving the aforementioned VR lens by the driver 113.

In step S179, whether the face size of the person to be set becomes more than a given size is checked. When the face size is not more than the given size, the flow proceeds to step S180. In step S180, whether the zoom lens reaches the maximum focal length position or not is checked. When the zoom lens does not reach the maximum focal length position, the flow returns to step S177 and zooming in operation and VR operation of the zoom lens are continued. In step S180, when the zoom lens reaches the maximum focal length position, the flow proceeds to step S181 to give a warning. The warning is shown on the LCD monitor 109 (not shown) as well as given by a sound by the buzzer 123 and the flow proceeds to the end. In step S179, when the face size of the person to be set exceeds the given size, the flow is completed. Here, the given size is set its approximate size, for example, about 10% of the whole image frame by the setting button 1164. Moreover, in step S178, the face of the person to be set may merely be moved to the center of the image frame not carrying out zooming in. Accordingly, the user can manually zoom in the desired subject locating in the center of the image frame so as to become the desired size. In this manner, users can store the shot image of their child securely finding their child among a large number of children in an occasion such as a sport meeting, a concert, or the like. Although the preceding explanation is the case that the face is automatically zoomed in when the size of the face is small, the face may be zoomed out automatically so as to become a given size when the size of the face is large. Similarly, in step S174, after reaching the maximum focal length position, when the image frame is changed by the user, the zoom lens may be zoomed out automatically until the desired face is detected. The sequences in these cases are similar to those in the case of zooming in, so the duplicated explanation is omitted.

<Setting Shooting Conditions>

Figure 6:
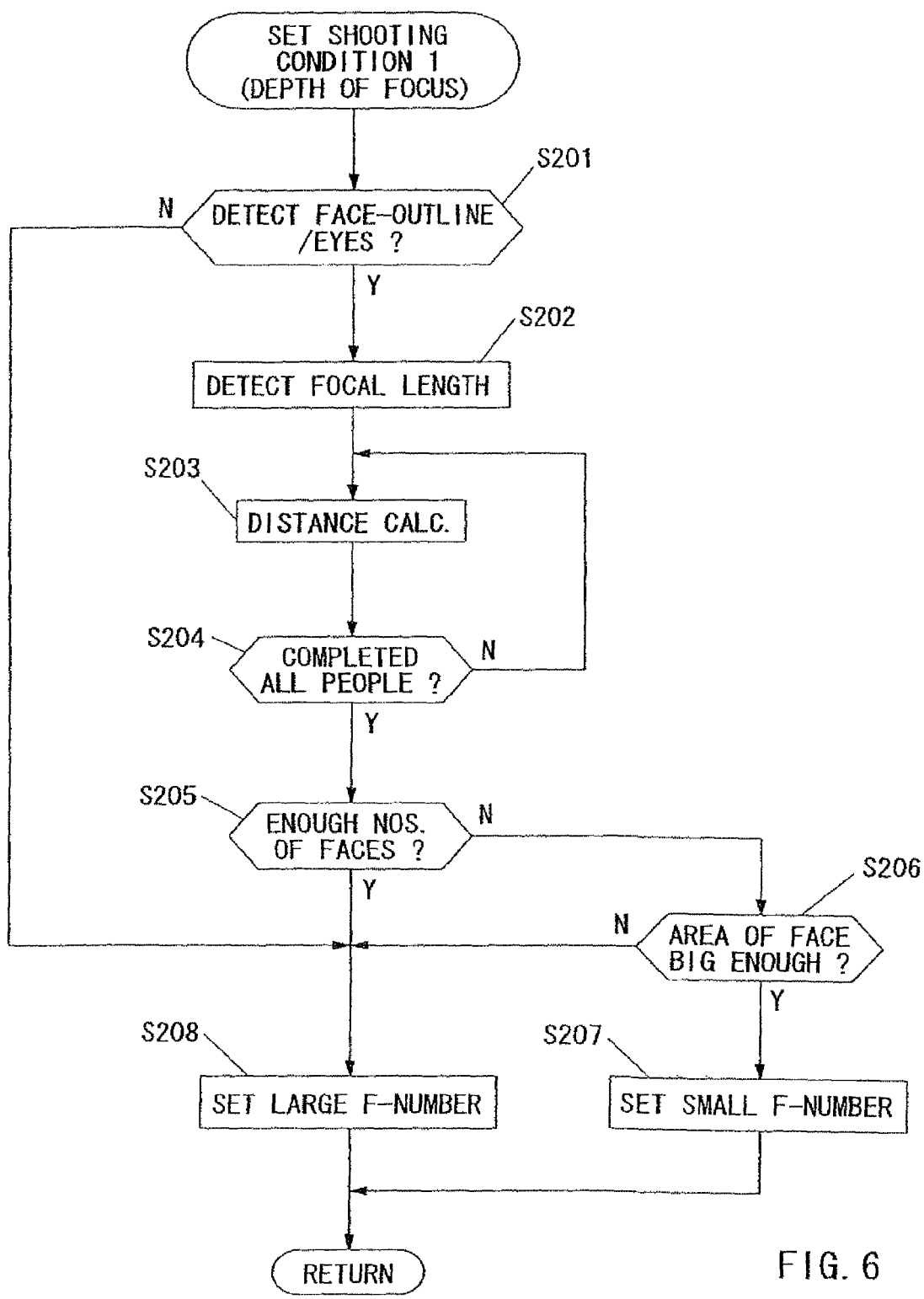
FIG. 6 is a flow chart explaining a sequence for setting shooting condition.
Figure 7:
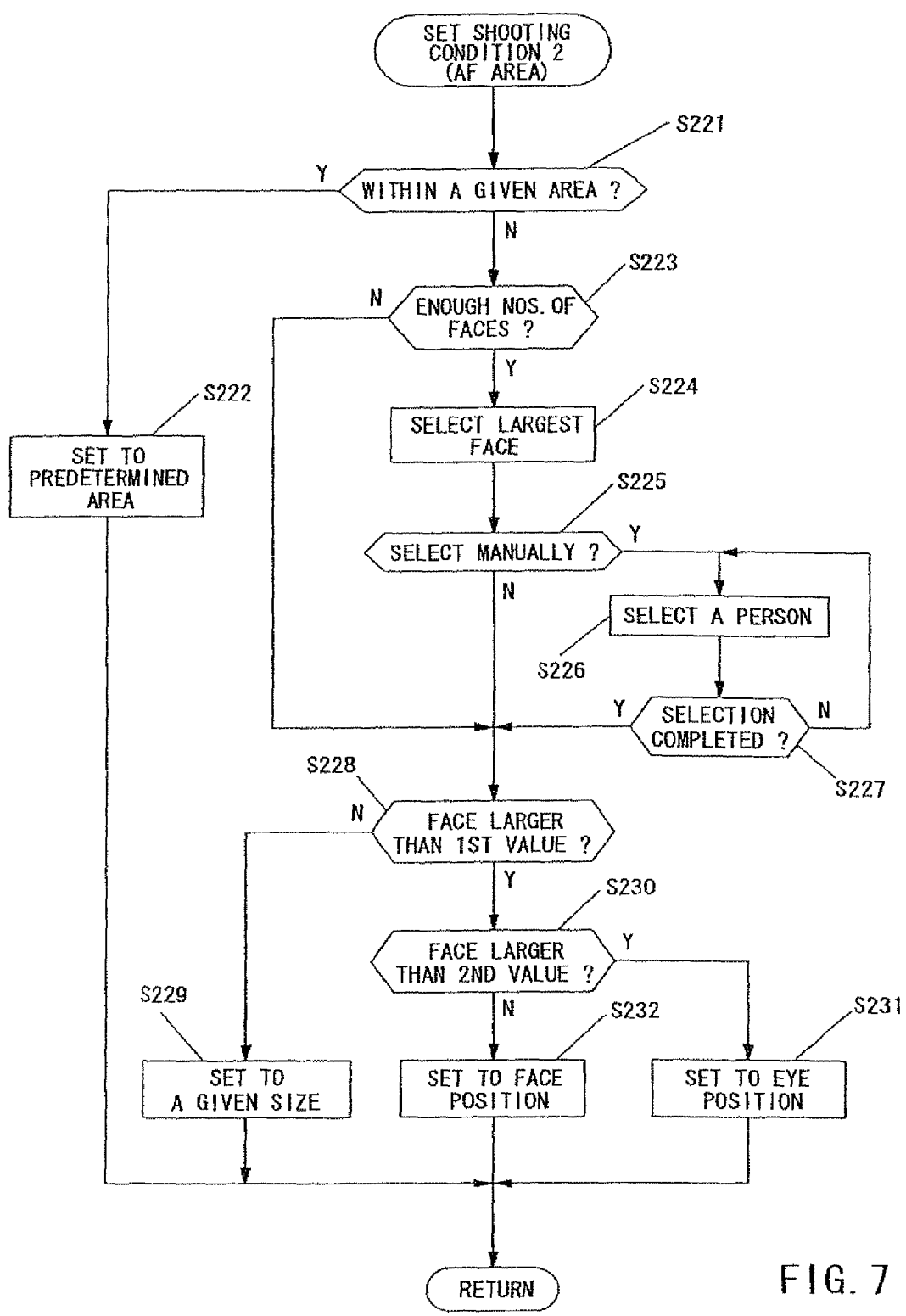
FIG. 7 is a flow chart explaining a sequence for setting other shooting condition.
Figure 8:
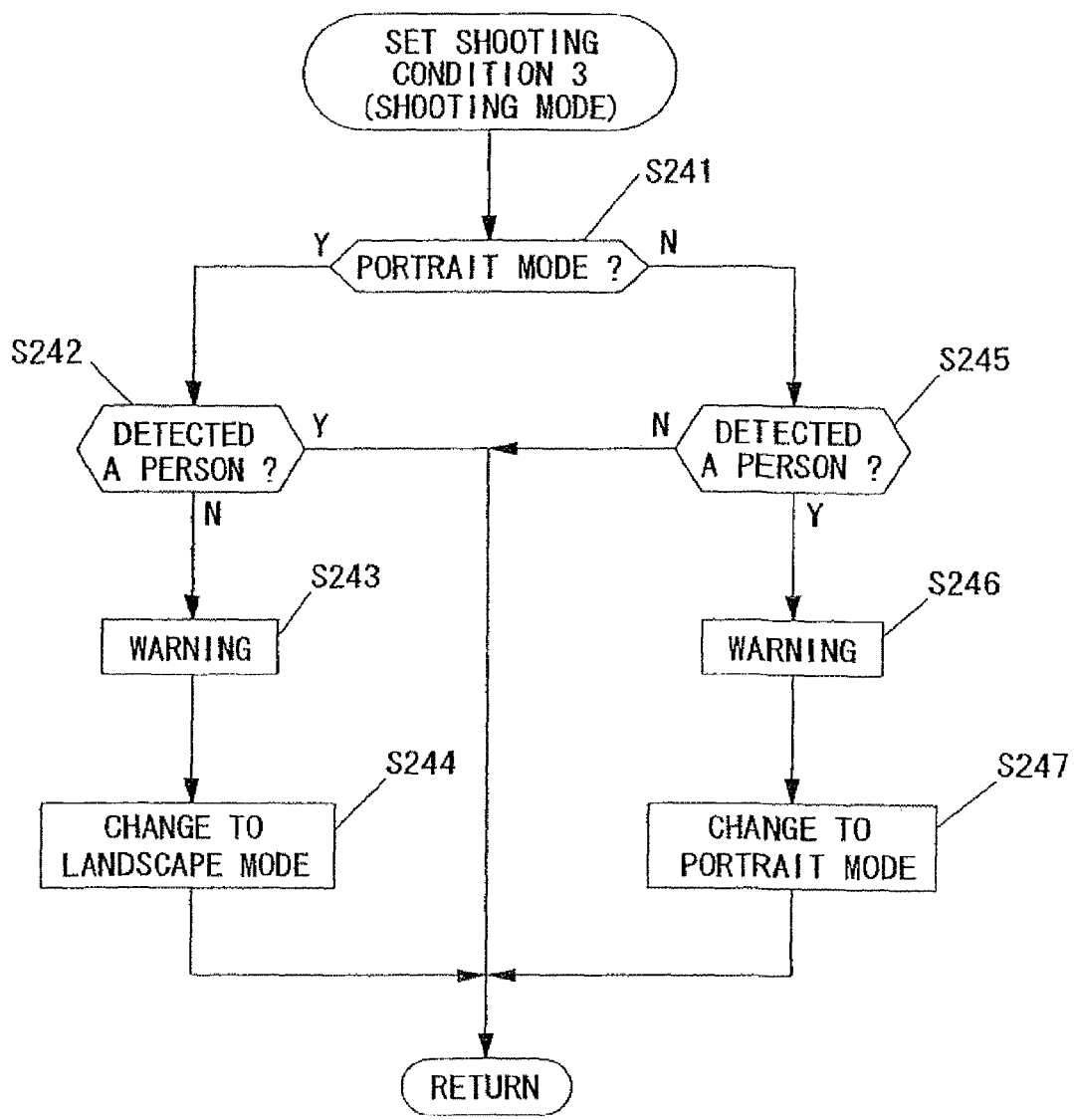
FIG. 8 is a flow chart explaining a sequence for setting other shooting condition.

Setting shooting conditions in step S111 shown in FIG. 2 is explained with reference to FIGS. 6 through 8. FIG. 6 is a flow chart showing how to set the best depth of focus by varying the aperture stop in response to the distance to each subject when a plurality of subjects are detected.

In step S201, whether an outline of the face or the eyes of a person is detected is checked. When neither of them is detected, the flow proceeds to step S208 concluding that the shot image is a long distance shot such and a landscape. In step S208, the aperture stop is set to a large value obtaining larger depth of focus. When an outline of the face or the eyes of a person is detected in step S201, the flow proceeds to step S202. In step S202, the zoom position (focal length) of the zoom lens is detected by the lens-position detector 121 and stored in the memory 1127. In step S203, the distance to the subject is calculated on the basis of the size of the face outline or the pupil distance stored in the memory 1127 and stored in the memory 1127. In step S204, whether the distance calculation has been completed regarding all people in the shot image frame is checked. When it has not been completed, the flow returns to step S203 and the distance calculations regarding respective people are carried out storing each result in the memory 1127.

After the distance calculation regarding all detected people has been completed, the flow proceeds to step S205. In step S205, the number of detected people is discriminated. When the number of people detected in step S205 is more than a given value, the shooting image is discriminated as a group photograph, so the flow proceeds to step S208. In step S208, the aperture stop is set to a large value obtaining larger depth of focus in order to bring every people into focus. In particular, the best depth of focus to bring everyone into focus is derived on the basis of the distance to each person detected in step S203 and the corresponding aperture value is set. When the number of people is less than the given value, the flow proceeds to step S206. In step S206, the face size of each detected person is discriminated. When the face size is more than a given value, the flow proceeds to step S207. In step S207, the shooting image is discriminated as a portrait photograph and the aperture value is set to a small value obtaining smaller depth of focus. On the other hand, when the face size is smaller than the given value, the shooting image is discriminated as a commemorative photograph with a landscape, so the flow proceeds to step S208 setting the aperture stop to a large value to obtain larger depth of focus. Here, the given value of the number of the people is set to three to four people in advance.

Accordingly, when a user has set the shooting mode to a landscape and a person is detected in the shooting image frame, the shooting mode can automatically be changed to a portrait mode suitable for shooting a person with smaller depth of field. On the other hand, when a user has set the shooting mode to a portrait mode and no person is detected, the shooting mode can automatically changed to a landscape mode with larger depth of focus. By the way, in the distance calculation to a subject described above, the face size and the pupil distance are different between an adult and a child, and have individual variations even among children. Accordingly, the value is an approximate distance derived from an average face size or pupil distance of an adult or an child. The accurate focusing position is determined on the basis of a peak position of the aforementioned contrast method.

Then, how to set AF area and AE area is explained with reference to FIGS. 7, 16, 17 and 18. In FIG. 7, although how to set AF area is explained, AE area can be set by the identical procedures. In step S221 shown in FIG. 7, whether any person is there in a given area of the shooting image frame or not is checked. In the method of checking the existence of a person, whether an outline of a face is detected or not is assumed to be checked.

Figure 16:
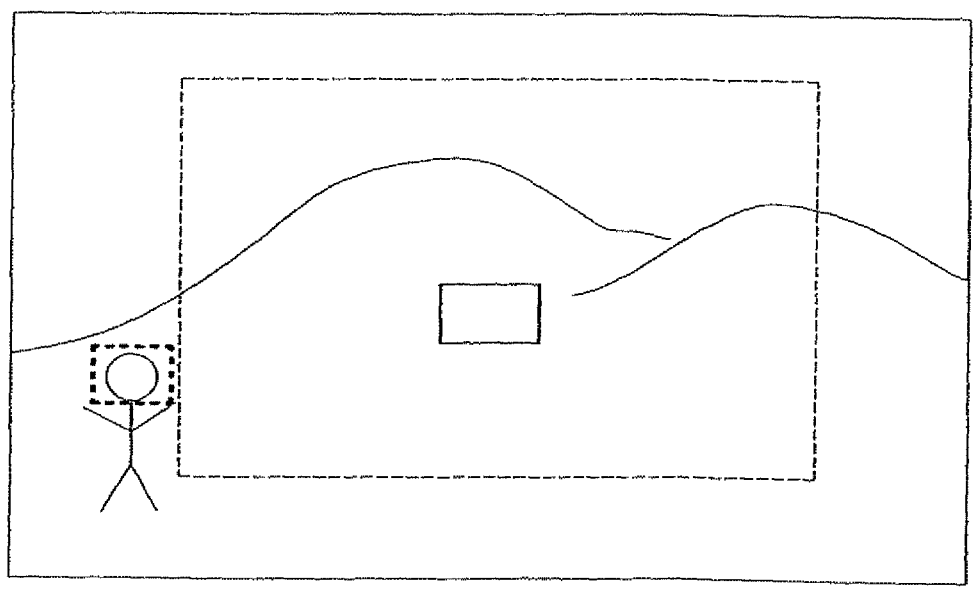
FIG. 16 shows an example of setting an AF area or an AE area.

When no person is detected, the flow proceeds to step S222. In step S222, a predetermined fixed area such as a central area is set to be an AF area. This is because even if a person is detected, when the person is locating on the periphery of the image frame, the camera concludes that the user does not put emphasis on the person, and excludes the person. FIG. 16 shows an example of the shooting area in such case. In FIG. 16, since the person marked with a bold broken line is located outside the area shown by a narrow broken line in the image frame, a predetermined central area shown by a bold solid line is set to be an AF area. When a plurality of points can be measured, other AF areas can be set in addition to the central area.

Figure 17:
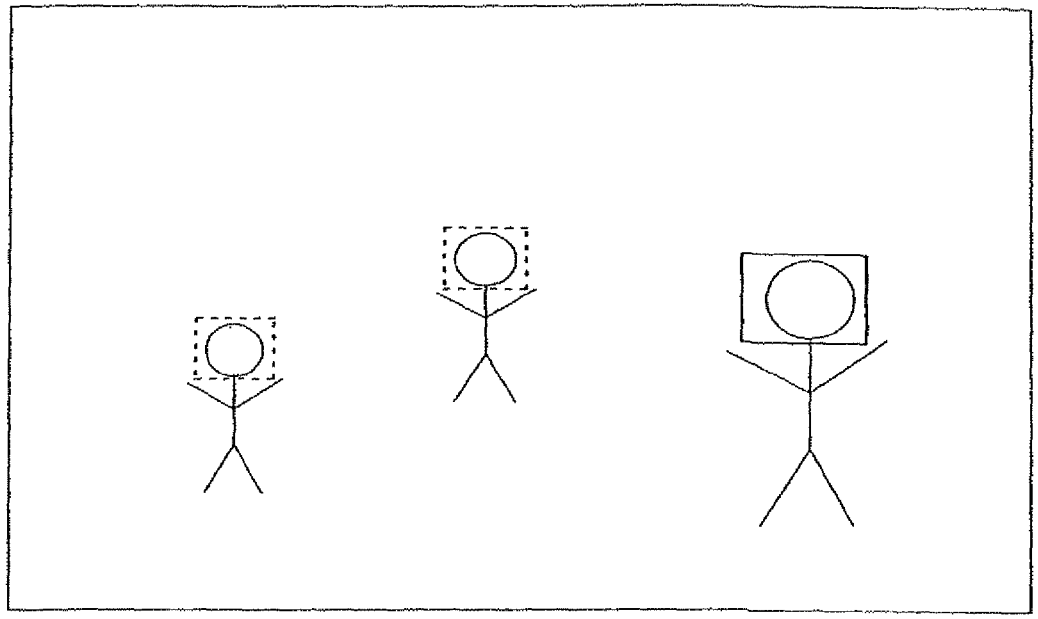
FIG. 17 shows another example of setting an AF area or an AE area.
Figure 18:
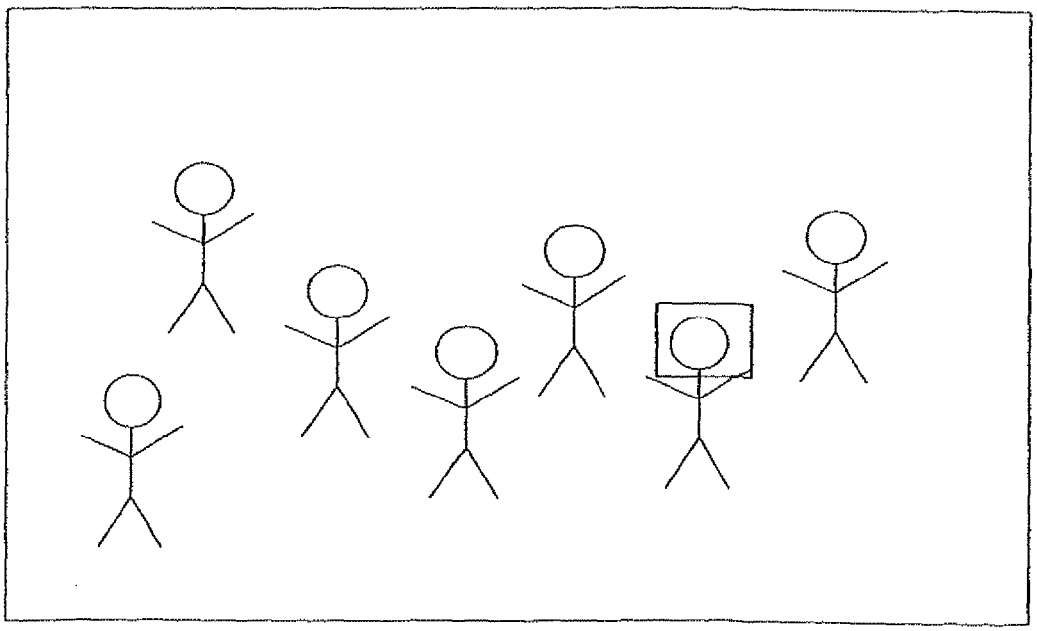
FIG. 18 shows another example of setting an AF area or an AE area.

In step S221, when a person is detected in the given area, the flow proceeds to step S223. In step S223, whether the number of the detected person is plural or not is checked. When the number is not plural, the flow proceeds to step S228, otherwise proceeds to step S224. In step S224, the largest face among the detected faces is selected to be an AF area and attached with a display to be an AF area. FIG. 17 shows an example of a shooting image frame in such case. The example shows that the largest detected face is set as an AF area by a solid line. In step S225, whether any other person other than that automatically set as an AF area is set as an AF area or not is checked. When any other person marked by a broken line is selected by operating the setting button 1164, the flow proceeds to step S226. In step S226, the AF area is moved in turn by the setting button 1164. In this case, when the detected person has a priority, the order of the selection is in order from the priority. However, the selection may be carried out in order of the size of the detected face. In step S227, when the selection has completed, the flow proceeds to step S228. In step S228, whether or not the area of the detected face is a first given value or more is checked. When the area is the first given value or less, the flow proceeds to step S229. In step S229, an AF area having a given size (here, the size of the first given value) including the detected face inside the area is set. This is because when the area of the detected face is too small, the precision of the aforementioned AF calculation becomes worse. FIG. 18 shows an example of such case.

Figure 19:
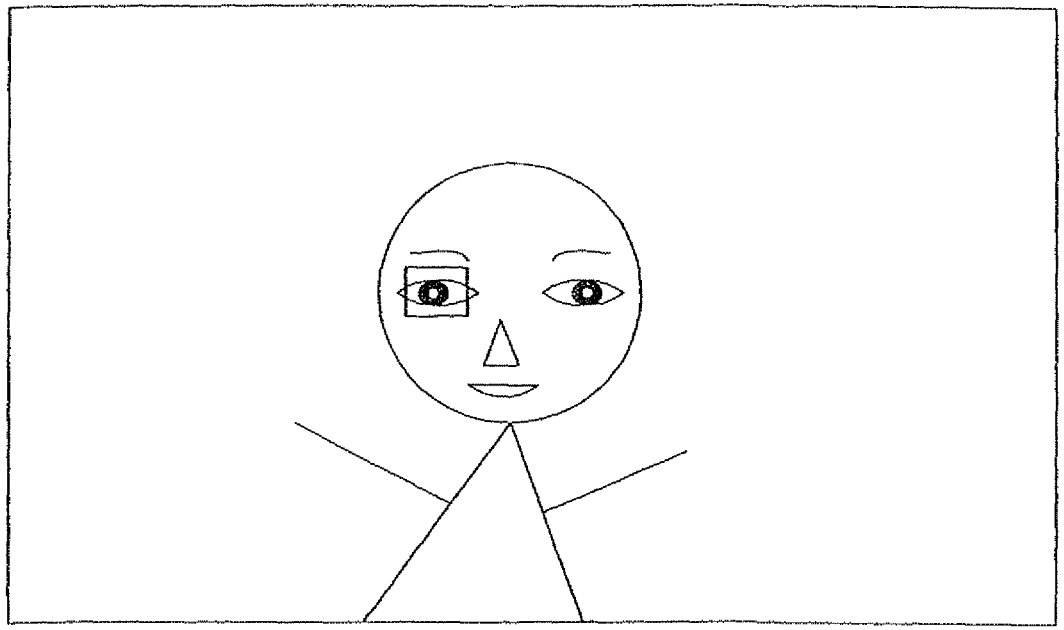
FIG. 19 shows another example of setting an AF area or an AE area.

In step S228, when the area of the detected face is larger than the first given value, the flow proceeds to step S230. In step S230, whether or not the area of the detected face is a second given value or more is checked. When the area is the second given value or more, the digital camera concludes that the shooting image is a portrait photograph and the flow proceeds to step S231. In step S231, the position of the detected eye is set to an AF area instead of setting whole face area to an AF area. FIG. 19 shows an example of the case. When the face area is the second given value or less, the flow proceeds to step S232. In step S232, the previously detected face area is set to an AF area. Here, the first and second given values are set to the best values in advance on the basis of shooting various subjects.

In the above-described explanation, although the largest face is selected at first in step S224, a person having the highest stored priority or a priority shooting person explained in the section of setting angle of view may be displayed first. Or a person may be selected in order from the shortest distance by calculating the distance to each person at the same time of detecting the face. Moreover, regarding the aforementioned priority shooting person, AF movement corresponding to a person may become resistant to the background by limiting the moving range of the focusing lens to a given range in the vicinity of the calculated distance. Furthermore, AF tracking movement to the highest priority person becomes fast and certain. Moreover, when a continuous shooting mode is set in a sports photograph or the like, the shooting distance of the first frame is determined on the basis of the peak evaluation value of the contrast method, and on and after the second frame the distance to the subject can be calculated by detecting the difference in the face outline or the pupil distance relative to that of the previous frame in combination with the zoom lens position. Accordingly, an AF control capable of tracking the subject movement with high speed can be realized.

The above-described sequence for setting an AF area can be applied to setting an AE area. In this case also, the first and second given values are determined to the best values in advance based upon experiments.

Then, change in the shooting mode is explained with reference to FIG. 8. In step S241, whether the shooting mode is set to a portrait mode suitable for shooting a portrait photograph or not is checked. In this portrait mode, for example, the aperture stop is set to a value near to full open in order to defocus the background, white balance is set making much on the skin color, and a focusing mode is set to the AF mode. When a portrait mode is set, the flow proceeds to step S242. In step S242, whether a person is detected or not is checked. When no person is detected, the flow proceeds to step S243. In step S243, it gives warning on the monitor or by a buzzer. In step S244, the shooting mode is changed to a landscape mode suitable for shooting a long distance subject and the sequence completes. In the landscape mode, in order to obtain large depth of focus, the aperture stop is set to a large value, and the focusing mode is set to a fixed position where the depth of focus reaches infinity by driving the focusing lens. White balance is set to an ordinary shooting condition or a condition making much on green of trees and blue of the sky upon shooting in the daytime. On the other hand, when a person is detected in step S242, the sequence completes. When a portrait mode does not set in step S241, the flow proceeds to step S245. In step S245, whether a person is detected or not is checked. When no person is detected, the sequence completes. When a person is detected, the flow proceeds to step S246. In step S246, it gives warning on the monitor or by a buzzer. In step S247, the shooting mode is changed to a portrait mode suitable for shooting a person and the sequence completes.

<Setting Speedlight>

Figure 9:
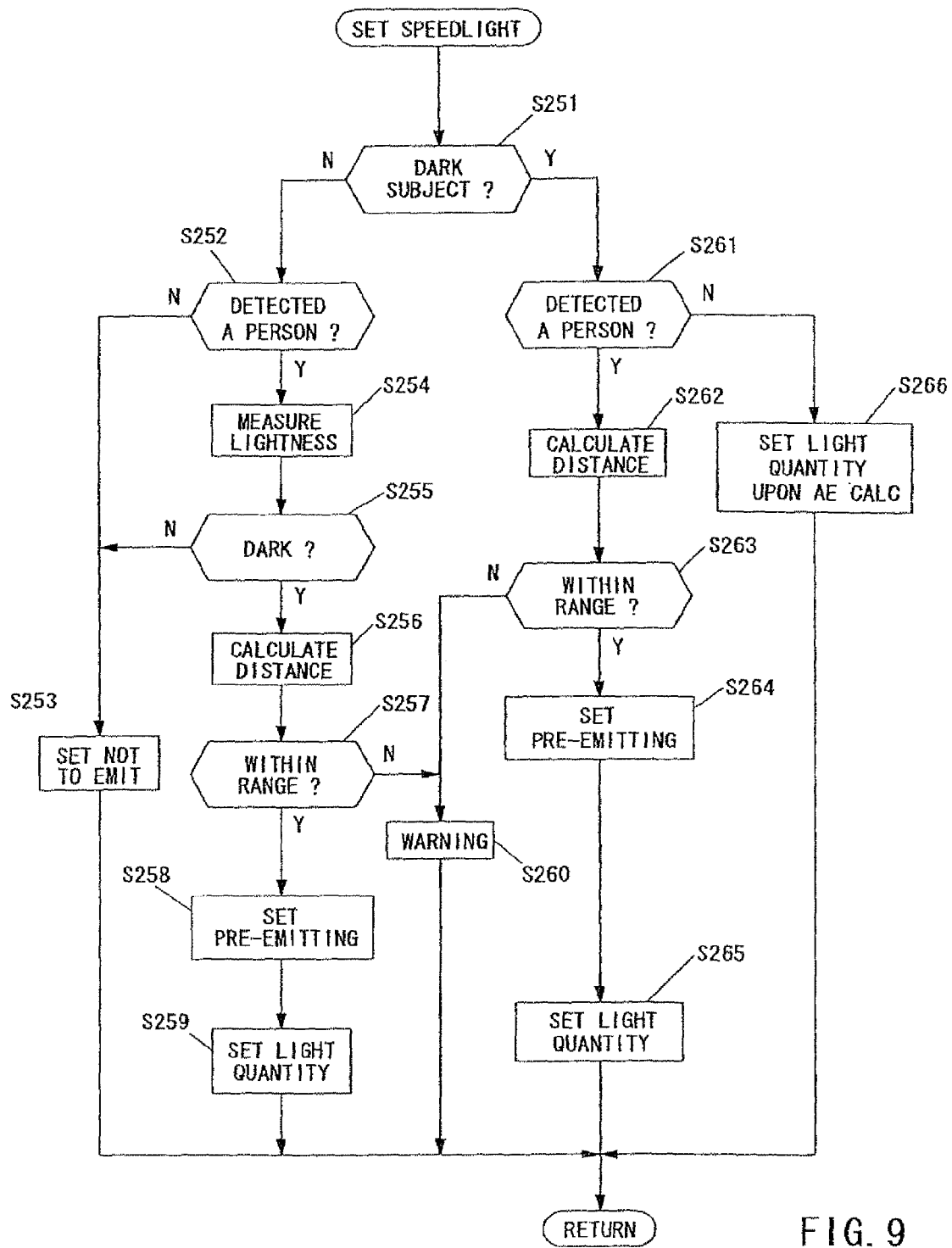
FIG. 9 is a flow chart explaining a sequence for setting an emitting light quantity of a speedlight.

The method of setting an emitting light quantity of a speedlight is explained with reference to FIG. 9.

In step S251, whether or not the luminance of the subject in a given AE area detected by the AE calculator 1121 is a given value or more is checked. Here, the subject is not limited to a person. When the luminance of the subject is less than the given value, in other words, a dark subject, the flow proceeds to step S261. When the luminance of the subject is more than the given value, in other words, a bright subject, the flow proceeds to step S252. In step S252, whether a person has been detected in the shooting image frame or not is checked.

In this case also, a person is discriminated by checking whether or not a face outline is detected. When no face outline is detected, flow proceeds to step S253. In step S253, the speedlight is set not to emit light. CPU 112 controls the speedlight not to emit light upon shooting on the basis of the setting not to emit light. Accordingly, upon actual shooting, the subject is exposed by a shutter speed and an aperture value on the basis of the calculation result of the AE calculator 1121.

When a face outline is detected in step S252, the flow proceeds to step S254. In step S254, lightness of the detected face is measured. In step S255, whether measured lightness of the face is brighter than a given vale or not is checked. When it is brighter than the given value, the flow proceeds to step S253, otherwise to step S256. In step S256, a distance to the detected person is calculated on the basis of the size of the detected face or the pupil distance and the focal length upon shooting similar to the aforementioned step S203 in FIG. 6. In step S257, whether the distance to the person is within the range of proper exposure of the speedlight or not is checked. When it is within the range of proper exposure, the flow proceeds to step S258. In step S258, the CPU sets a pre-emitting mode emitting light prior to shooting in order to reduce red-eye and step proceeds to step S259. In step S259, the emitting light quantity of the speedlight is set on the basis of the calculation to give proper exposure to the face of the detected person. Accordingly, CPU 112 controls to set the shutter speed and aperture value calculated by the AE calculator 1121 upon actual shooting. So, whole image frame except the person is shot with a proper exposure. On the other hand, regarding a person darker than the surroundings a speedlight is controlled to emit with a proper light quantity calculated on the basis of the distance to the person. Therefore, the person also can be shot with a proper exposure. The function is especially effective for shooting with backlight. Before emitting the speedlight CPU 112 controls the speedlight to give pre-emitting set in step S258 in order to reduce red-eye. The pre-emitting may be set to emit a plurality of times. In step S257, when the distance to the person is not within the range of proper exposure of the speedlight, the flow proceeds to step S260. In step S260, the warning that the person is not given a proper exposure is displayed (not shown).

In step S251, when the luminance of the subject is a dark subject, the flow proceeds to step S261. In step S261, whether a person has been detected in the shooting image frame or not is checked. When an outline of a face is detected, the flow proceeds to step S262. In step S262 as the same as in step S256, a distance to the detected person is calculated. In step S263, whether the distance to the person is within the range of proper exposure of the speedlight or not is checked. When it is not within the range of proper exposure, the flow proceeds to step S260. In step S260, a warning that the person is not given a proper exposure is displayed. On the other hand, when the distance is within the range of proper exposure, the flow proceeds to step S264. In step S264, the CPU sets a pre-emitting mode emitting light prior to shooting. The pre-emitting mode is for determining the emitting light quantity of the speedlight upon actual shooting on the basis of the reflected light from the face upon pre-emitting in addition to the reduction of red-eye described in step S258. In step S265, the emitting light quantity of the speedlight upon actual shooting is determined on the basis of the reflected light from the face upon pre-emitting. Similar to the prior case, the pre-emitting may be set to emit a plurality of times. The pre-emitting for reducing red-eye and that for measuring reflected light may be carried out separately. In step S261, when an outline of a face is not detected, the flow proceeds to step S266. In step S266, the emitting light quantity of the speedlight is set on the basis of the AE calculation of the luminance of the subject. In step S258 or S264, instead of setting the pre-emitting mode for reducing red-eye, it may be possible that red-eye is corrected by software detecting the pupil of the shot image after shooting.

<Shooting>

Figure 10:
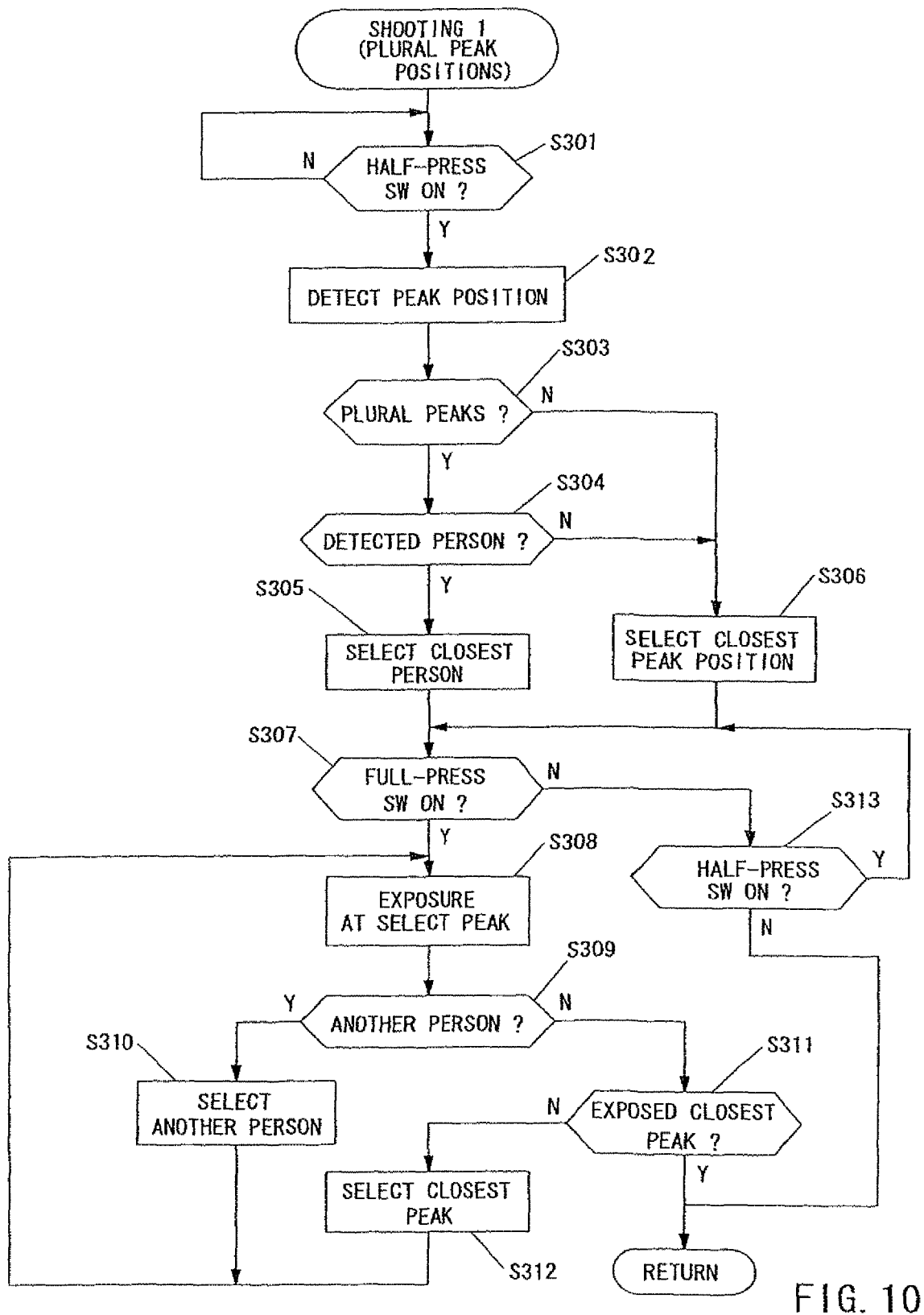
FIG. 10 is a flow chart explaining a shooting sequence.

Sequences of two shooting methods different from an ordinary shooting method are explained with reference to FIGS. 10, 11, 20 and 21. FIG. 10 is a flowchart showing a sequence constructed such that when a full-press switch 1163 is turned on once, the digital camera automatically shoots at a plurality of peak positions of the focus evaluation value obtained from the AF area. Accordingly, a plurality of image frames focusing at respective subjects corresponding to respective peak positions. In step S301, when a half-press switch 1162 is turned on, the flow proceeds to step S302. In step S302, CPU 112 carries out focusing from the closest distance to infinity to calculate evaluation value and detects peak values. In step S303, whether there is a plurality of peak values or not is checked. When the peak value is only one, the flow proceeds to step S304. In step S304, whether a person is detected by the feature-detection calculator 1123 or not is detected. When a person is detected, a distance to the detected person is calculated on the basis of the size of the detected face or the pupil distance and the focal length upon shooting and is discriminated whether which peak position among a plurality of peak positions is corresponding to. In step S305, CPU 112 selects a closest locating person as the first shooting position and drives the focusing lens to the peak position corresponding to the closest person. In step S303, when the peak position is only one, the flow proceeds to step S306. In step S306, the detected peak position (in this case, the position becomes the closest peak position) is selected. In step S304, when a plurality of peak positions are detected and when no person is detected, the flow proceeds to step S306. In step S306, the closest position is selected as a shooting position.

In step S307, whether the full-press switch 1163 is turned on or not is checked. When the switch is not turned on, the flow proceeds to step S313. On the other hand, when the switch is turned on, the flow proceeds to step S308. In step S308, an exposure is carried out at a peak position selected in step S305 or S306 and the stored image data is read out after the exposure is over. In step S309, whether there is another peak position corresponding to another person or not is checked. When a peak position corresponding to another person is there, the flow proceeds to step S310. In step S310, the position is selected and the flow returns to step S308. In step S308, the second exposure is carried out and the stored image data is read out after the exposure is over. When any other peak position corresponding to the other person is not there, the flow proceeds to step S311. In step S311, whether the exposure for the closest peak position is completed or not is checked. When the exposure for the closest peak position is not completed, the flow proceeds to step S312. In step S312, the exposure is continued. When the exposure for the closest peak position is completed, the sequence is completed.

In step S307, when the full-press switch 1163 is not turned on, the flow proceeds to step S313. In step S313, whether the half-press switch 1162 is turned on or not is checked. When the half-press switch 1162 is turned on, the flow returns to step S307. In step S307, the focusing is locked until the full-press switch 1163 is turned on. On the other hand, in step S313, when the half-press switch 1162 is not turned on, the sequence is completed.

Figure 20:
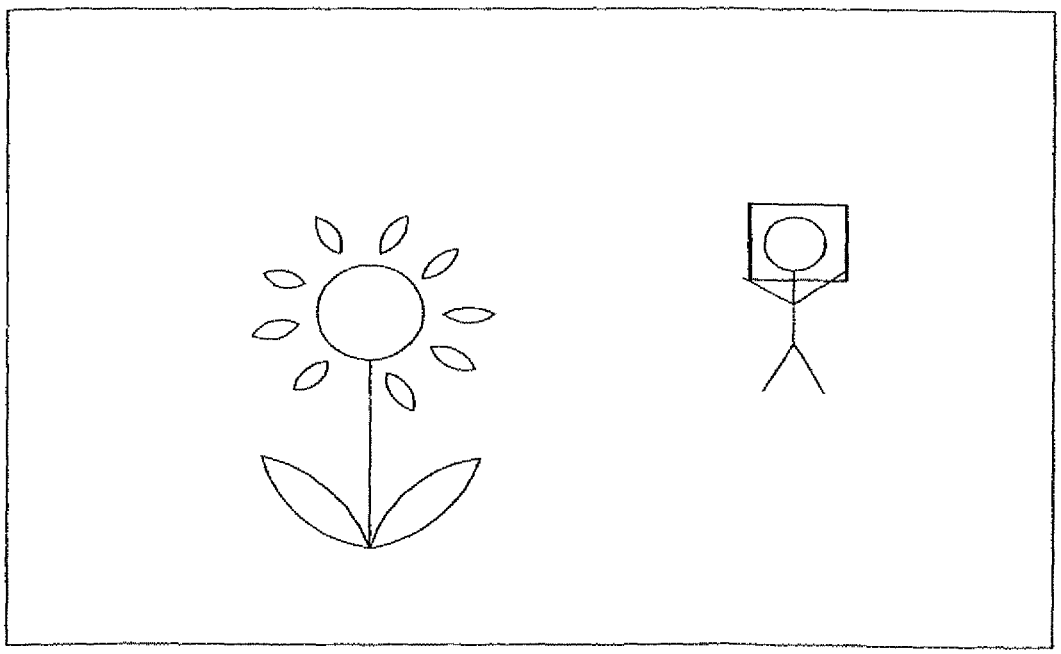
FIG. 20 shows an example of setting an AF area.
Figure 21:
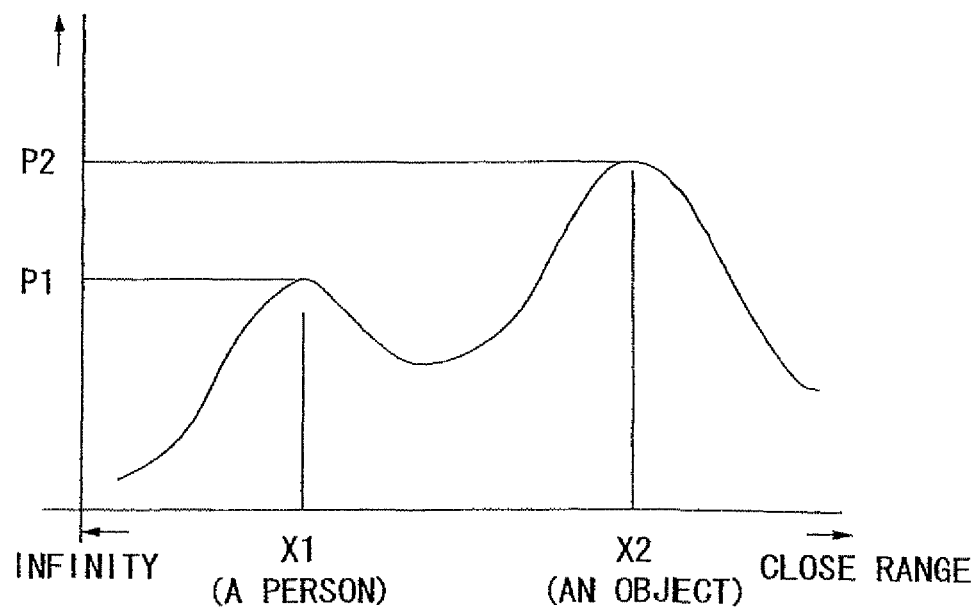
FIG. 21 is a graph showing change in evaluation value relative to the focusing lens position.

An example of actual shooting is explained with reference to FIGS. 20 and 21. FIG. 20 is a drawing showing a case a person and a flower locating on this side of the person are disposed in a shooting image frame. In an ordinary AF shooting, since the closest object has priority of focusing, in this case, a single image frame focusing at the flower locating on this side is shot. FIG. 21 is a graph showing change in evaluation value relative to the focusing lens position. In the case where the whole image frame is assumed to be an AF area, change in the evaluation value is shown. In this case, two peak positions (P1 and P2) are detected in the evaluation value. In an ordinary AF, when the values have a given value or more, the closest peak P2 is selected regardless of their mutual sizes. When only the subject contrast is simply detected in this manner, you cannot tell whether a person is which peak position P1 or P2. On the other hand, by calculating distance to the person on the basis of the face size or pupil distance, you can tell the peak position x1 is corresponding to a person. Accordingly, by shooting two times at the closest peak position x2 and the peak position x1 corresponding to the person, image data being in focus at each subject can be obtained. Alternatively, by shooting only peak positions corresponding to people, it is possible to set that when the closest peak position is not corresponding to a person, the subject is not shot. In this case, similar to the setting the angle of view, it is possible to set that a person having priority to be shot is set to the camera in advance and only one peak position corresponding to the person is shot.

Accordingly, even if more than one person are there in the AF area, an image frame securely focused to a desired person can be obtained. When a plurality of people are there, it may be possible that each person who is corresponding to a peak position of the evaluation value having a given value or more is shot instead of shooting everyone. Alternatively, it may be possible to set maximum number of serial shooting. As described before, since the distance to the feature point calculated on the basis of the feature point is not accurate, by using this method in detecting peak points of people complementary to the contrast method when a plurality of peak values are there, people can be focused precisely.

Then, the method avoiding a shot with closed eyes is explained with reference to FIG. 11. In step S321, whether the full-press switch 1163 is turned on or not is checked. When the full-press switch 1163 is turned on, the flow proceeds to step S322. In step S322, the pupil of a subject of the image data before turned on the full-press switch 1163 is detected by the feature-detection calculator 1123. When it is discriminated that the pupil is not detected because the subject is closing his/her eyes, the flow proceeds to step S323. In step S323, the actual exposure is postponed until the pupil is detected and the flow returns to step S322. When the pupil is detected, the flow proceeds to step S324. In step S324, the actual exposure is carried out. In step S325, the exposed image data is read out. In step S326, whether the pupil is detected by the feature-detection calculator 1123 is checked. When the pupil is not detected, the flow proceeds to step S327. In step S327, a warning sound is given by a buzzer 123 and the flow returns to step S322. In step S326, when the pupil is detected, the sequence is completed. In this manner, whether the subject's eyes are opened or not is checked before and after the actual shooting. Accordingly, when the subject is shot with his/her eyes closed, you can shoot again without delay. Alternatively, when the subject is shot with his/her eyes closed, you may correct the pupil of the shot image by software after shooting instead of shooting again. As for the correction method, the opened eyes of the subject are detected from a video image of the subject shot after shooting and replaced with the closed eyes.

Figure 11:
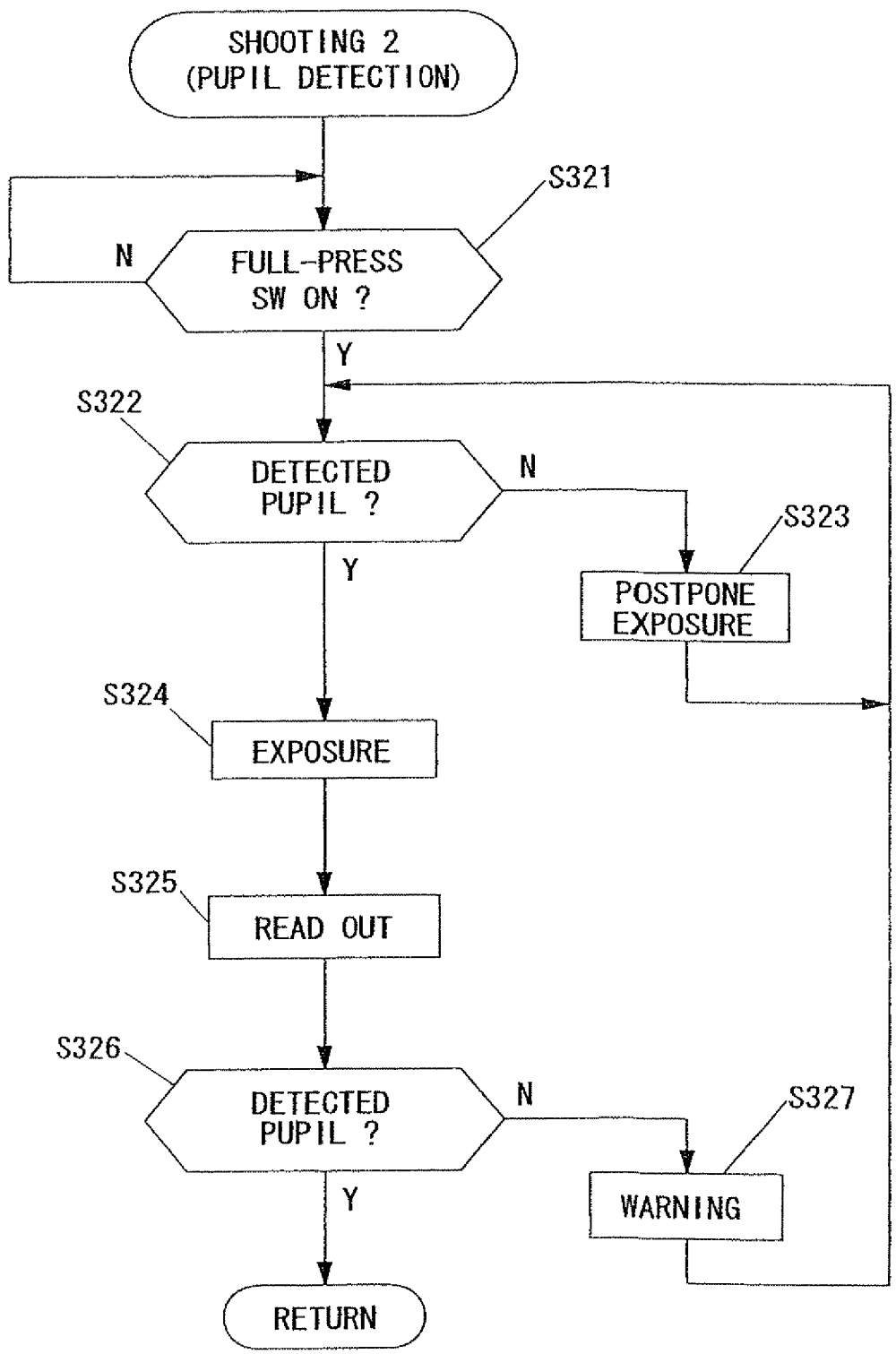
FIG. 11 is a flow chart explaining an other shooting sequence.

In the explanation with reference to FIG. 11, although the subject shot with his/her eyes closed is detected after shooting and shot again, the other defects of the shot subject can also be corrected by shooting again. For example, when the subject moves upon shooting, it is discriminated by detecting an image movement from the reproduced image. When the face of a person is hidden upon shooting a group photography, the number of faces is compared by counted before and after shooting or when the outline of a face is not clear enough, it is possible to set the camera to shoot again. In the warning in step S327, not only gives a warning by a buzzer, but also voice warning explaining particular problem may be possible such as "Someone closed eyes.", "Camera, shake!", or "Someone's face is hidden away."

<Storing>

Figure 12:
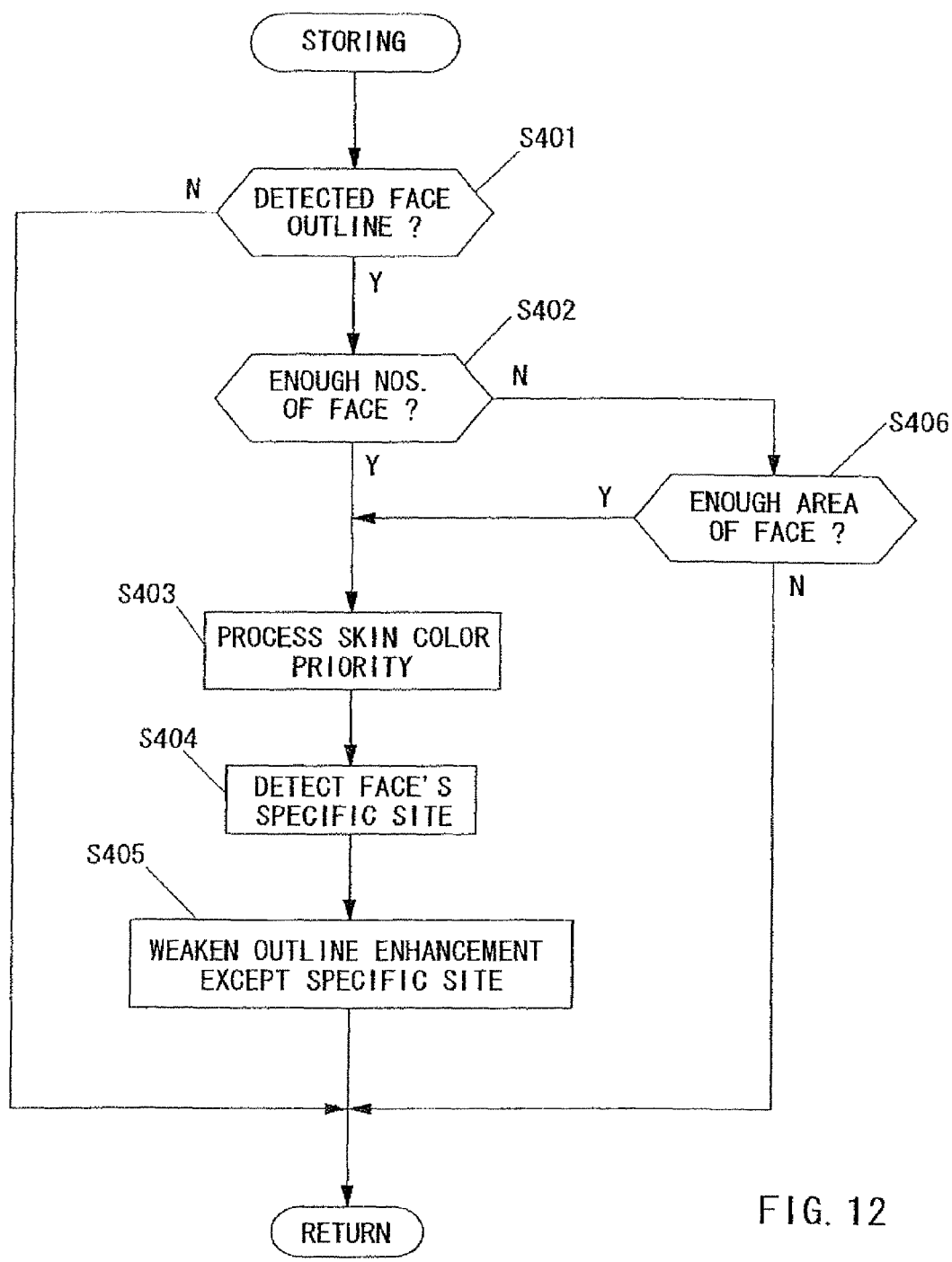
FIG. 12 is a flow chart explaining a shooting sequence.

Storing procedure accompanying with detecting feature point is explained with reference to FIG. 12.

In step S401, whether the face outline of a person is detected by the feature-detection calculator 1123 or not is detected. When it is not detected, storing procedure is carried out by using parameters for color reproduction or outline enhancement set in advance. When the face outline is detected, the flow proceeds to step S402. In step S402, the number of the detected faces is counted. When the number of the faces is a given number or less, the flow proceeds to step S406, other wise to step S403. Here, the given number is preferably three to four. When the detected number is more than three to four, the image is discriminated as a group photography and the flow proceeds to step S403. In step S403, parameters for color reproduction is used giving priority to skin color in the digital signal processor 106. In step S404, a specific site of the face is detected. In step S405, the outline enhancement of the face except the specific site is processed to become weak. The specific site is such as an eye, a nose, a mouth, ears, hair, an eyebrow, and the like. Accordingly, since a low-pass-filter is applied to spatial frequency characteristics except the specific site, wrinkles, moles, freckles, or the like can be inconspicuous. In step S402, when the number of faces is a given value or less, the flow proceeds to step S406. In step S406, the size of the face is checked. When a plurality of faces are detected, the largest face is compared. When the area of the face is a given value or more, the image is discriminated as a portrait photograph and the flow proceeds to step S403 selecting procedure priority to skin color. On the other hand, when the area of the face is a given value or less, the image is discriminated as a ceremonial photograph with landscape and an ordinary storing procedure is carried out.

As described above, in step S403, not only the face portion but also whole image area is selected the procedure using parameters priority to skin color instead of ordinary color parameters. This is because the area except skin has little skin color component, so that even if the procedure using parameters priority to skin color is carried out, not much effect is received. Accordingly, complicated procedure that picks up the face portion only and carries out the procedure using parameters priority to skin color only to the portion becomes not necessary.

In the explanation described above, contrary to the process is step S405, by increasing the outline enhancement to the detected specific site such as an eye, a nose, a mouth, ears, hair, an eyebrow, and the like, the face can be expressed boldly. Since the outline enhancement is not effective to a small face, it is possible to set that the outline enhancement is carried out only to a face having a certain amount of area.

Moreover, it may be possible to select either step S403 for the skin color process or step S405 for the outline enhancement. By preparing a plurality of parameters for the skin color process or the outline enhancement and suitably selecting such parameters, it is easy that the degree of skin color or outline enhancement is made to be the best condition. Moreover, in the case of detecting age and sex, parameters for saturation and luminance may be selected as well as parameters for hue on the basis of the detected result.

In the explanation described above, although these procedures are carried out before storing, these procedures may be carried out upon reproducing. By storing characteristic information, white balance process information and outline enhancement process information of each person in addition to the aforementioned feature point information and feature point data in the image file explained in FIG. 14, the best procedures can be carried out upon reproducing.

In the explanation described above, the feature point detection is carried out before shooting the subject as described in step S105 in FIG. 2. When the procedure for storing described in FIG. 12 is carried out, the feature point detection is not necessary to carry out before shooting. The feature point detection may be carried out to the shot image data after shooting. In other words, the feature point detection may be carried out only to the shot image data by locating step S105 for detecting a feature point before step S114 for storing procedure. Accordingly, since the feature detection is not carried out before shooting, the shooting procedure can be carried out quickly, so you can shoot without loosing shutter chance.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the present disclosure and their equivalents.

What is claimed is:

1. A digital camera system comprising:
   a first storing unit that stores a first feature point;
   a detecting unit that detects a second feature point from an object image prior to shooting the object image;
   a display that displays a first marker indicating the second feature point overlaying with the object image;
   a determination unit that determines whether the second feature point is coincident with the first feature point;
   a receiving unit that receives an order regarding a priority of a plurality of second feature points from a user;
   a selecting unit that selects a feature point from the plurality of second feature points in accordance with the priority instructed by the receiving unit when the plurality of second feature points are detected;
   a display controlling unit that controls to display a second marker, which is different from the first marker overlaying with the second feature point, which is coincident with the first feature point, and a third marker indicating the selected feature point, when the determination unit determines that the second feature point is coincident with the first feature point;
   a shooting condition setting unit that sets a shooting condition in accordance with the selected feature point; and
   a shooting unit that shoots the object image on the shooting condition set by the shooting condition setting unit.

2. The digital camera system according to claim 1, further comprising:
   a face detection unit that detects a size of a face from the second feature point detected by the detecting unit, wherein the selecting unit selects the face in descending order of the face size detected by the face detection unit.

3. The digital camera system according to claim 1, further comprising: a distance detection unit that detects distances to each of the plurality of second feature points, wherein the selecting unit selects the second feature points in ascending order based on the distances detected by the distance detection unit.

4. The digital camera system according to claim 1, wherein the shooting condition setting unit includes a focus-area-setting unit that sets a given area including the selected feature point selected by the selecting unit as a focus area for detecting focus.

5. The digital camera system according to claim 1, wherein the shooting condition setting unit includes a photometry-area-setting unit that sets a given area including the feature point selected by the selecting unit as a photometry area.

6. The digital camera system according to claim 1, wherein the first storing unit further stores information regarding a name of the first feature point.

7. The digital camera system according to claim 1, wherein the priority is determined when the plurality of second feature points are detected at a time.

8. The digital camera system according to claim 7, further comprising:
   a discriminating unit that discriminates the priority, wherein the selecting unit selects the second feature points in order of the priority discriminated by the discriminating unit.

9. The digital camera system according to claim 7, further comprising:
   a distance-measuring-area-setting unit that sets a distance measuring area for measuring a distance to a subject displayed on the display, wherein the priority is a priority among the plurality of second feature points based on the distance measuring area set by the distance-measuring-area-setting unit.

10. The digital camera system according to claim 7, further comprising: a photometry-area-setting unit that sets a photometry area for measuring lightness of the subject displayed on the display, wherein the priority is a priority among the plurality of second feature points based on the photometry area set by the photometry-area-setting unit.

11. The digital camera system according to claim 1, wherein
   information regarding the second feature point is stored with image data including the second feature point, and
   the information regarding the second feature point is at least one of color process information and outline correction process.

12. The digital camera system according to claim 1, wherein
   information regarding the second feature point is reproduced including the second feature point, and
   the information regarding the second feature point is at least one of color process information and outline correction process information.

13. The digital camera system according to claim 1, further comprising: a discriminating unit that discriminates and displays whether or not at least one of the first feature point and information regarding the first feature point is stored in the first storing unit.

14. The digital camera system according to claim 1, further comprising:
   an input unit that inputs information regarding the second feature point displayed on the display;

an instruction unit that instructs to store the second feature point and information regarding the second feature point in connection with the object image; and a second storing unit that stores the second feature point, information regarding the second feature point, and the object image instructed by the instruction unit.

15. The digital camera system according to claim 14, wherein information regarding the second feature point is detected in the object image, and the information regarding the second feature point is positional information in the object image upon detecting the second feature point from the object image.

16. The digital camera system according to claim 1, wherein the first storing unit stores the first feature point and first specific name information regarding the first feature point, and the system further comprises:

an input unit that inputs second specific name information regarding the second feature point detected by the detecting unit; and a storing instruction unit that instructs to additionally store in the first storing unit the second feature point when the first specific name information and the second specific name information are identical and the first feature point and the second feature point are different.

17. The digital camera system according to claim 1, wherein the first storing unit stores the first feature point and first specific name information regarding the first feature point, and the system further comprises:

a second storing unit that stores the second feature point and second specific name information in connection with image data; and a storing instruction unit that instructs to additionally store in the first storing unit the second feature point when the first feature point and the second feature point are different.

18. The digital camera system according to claim 1, wherein the first storing unit stores the first feature point and first specific name information regarding the first feature point, and the system further comprises:

a second storing unit that stores the second feature point and second specific name information in connection with image data; and a storing instruction unit that instructs to additionally store in the second storing unit the first feature point when the first feature point and the second feature point are different.

19. The digital camera system according to claim 1, further comprising:

a second storing unit that stores the second feature point together with information regarding the second feature point detected from the object image; and a deleting unit that deletes from the second storing unit information regarding the second feature point displayed on the display.

20. The digital camera system according to claim 1, further comprising:

a second storing unit that stores the second feature point together with information regarding the second feature point detected from the object image; and a controller that changes at least a portion of the second feature point or information regarding the second feature point displayed on the display and stores the at least a portion of the second feature point or the information regarding the second feature point displayed on the display into the second storing unit.

* * * * *